(12) United States Patent
Maeda

(10) Patent No.: US 12,138,799 B2
(45) Date of Patent: Nov. 12, 2024

(54) ROBOT CONTROL SYSTEM, ROBOT CONTROLLER, AND ROBOT CONTROL METHOD

(71) Applicant: KABUSHIKI KAISHA YASKAWA DENKI, Kitakyushu (JP)

(72) Inventor: Takahiro Maeda, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 308 days.

(21) Appl. No.: 17/679,156

(22) Filed: Feb. 24, 2022

(65) Prior Publication Data

US 2022/0274253 A1 Sep. 1, 2022

(30) Foreign Application Priority Data

Feb. 26, 2021 (JP) ................. 2021-030295

(51) Int. Cl.
*B25J 9/16* (2006.01)
*G05B 19/4155* (2006.01)

(52) U.S. Cl.
CPC ............ *B25J 9/1656* (2013.01); *B25J 9/161* (2013.01); *B25J 9/1664* (2013.01); *B25J 9/1651* (2013.01); *B25J 9/1661* (2013.01); *G05B 19/4155* (2013.01); *G05B 2219/39371* (2013.01)

(58) Field of Classification Search
CPC ........ B25J 9/1664; B25J 9/1651; B25J 9/161; B25J 9/1656; B25J 9/1661; G05B 19/41; G05B 2219/34095; G05B 2219/39371; G05B 2219/40516; G05B 19/4155
See application file for complete search history.

(56) References Cited

U.S. PATENT DOCUMENTS

| 2009/0037021 | A1* | 2/2009 | Sladek | G05B 19/416 |
| | | | | 901/14 |
| 2019/0202054 | A1* | 7/2019 | Hayashi | B25J 19/026 |
| 2020/0130184 | A1* | 4/2020 | Suzuki | B25J 9/1666 |
| 2020/0341448 | A1 | 10/2020 | Pitz et al. | |

(Continued)

FOREIGN PATENT DOCUMENTS

| JP | H08241105 A | * | 9/1996 | ............ G05B 19/05 |
| JP | 2002-187081 A | | 7/2002 | |
| JP | 2004-252814 A | | 9/2004 | |

(Continued)

OTHER PUBLICATIONS

Extended European Search Report issued Jul. 20, 2022 in European Patent Application No. 22157705.9, 9 pages.

(Continued)

*Primary Examiner* — Ian Jen
*Assistant Examiner* — Karston G. Evans
(74) *Attorney, Agent, or Firm* — Oblon, McClelland, Maier & Neustadt, L.L.P.

(57) ABSTRACT

A robot control system includes robot controller circuitry that controls a robot, and host controller circuitry that communicates with the robot controller circuitry. The host controller circuitry further executes a control program, and transmits a command according to an execution result of the control program to the robot controller circuitry, and the robot controller circuitry further receives the command from the host controller circuitry, and executes pre-processing according to the command.

20 Claims, 14 Drawing Sheets

(56) References Cited

U.S. PATENT DOCUMENTS

| | | | | |
|---|---|---|---|---|
| 2020/0384638 A1* | 12/2020 | Szabo | .................... | B25J 9/1664 |
| 2023/0286149 A1* | 9/2023 | Katou | .................... | B25J 9/1656 |

FOREIGN PATENT DOCUMENTS

| | | | | | |
|---|---|---|---|---|---|
| JP | 2006-252394 | A | 9/2006 | | |
| JP | 2008-188722 | A | 8/2008 | | |
| JP | 2016-030308 | A | 3/2016 | | |
| JP | 2018-051653 | A | 4/2018 | | |
| JP | 2020-189385 | A | 11/2020 | | |
| JP | 6801333 | B2 | 12/2020 | | |
| WO | WO-2019166229 | A1 * | 9/2019 | ............. | B23Q 15/20 |

OTHER PUBLICATIONS

Anders Blomdell, et al., "Extending an Industrial Robot Controller: Implementation and Applications of a Fast Open Sensor Interface," IEEE Robotics & Automation Magazine, XP055940780, Sep. 2005, pp. 85-94.

Günter Schreiber, et al., "The Fast Research Interface for the KUKA Lightweight Robot," ICRA 2010 Workshop on Innovative Robot Control Architectures for Demanding (Research) Applications, XP055614534, 2010, pp. 15-21.

Office Action issued Jun. 18, 2024 in corresponding Japanese Patent Application No. 2021-030295 (with English translation), 17 pages.

\* cited by examiner

A predetermined event occurs while moving from P2 to P3, move to P20 to P21 to P0.

ROBOT CONTROL SYSTEM, ROBOT CONTROLLER, AND ROBOT CONTROL METHOD

CROSS-REFERENCE TO RELATED APPLICATIONS

The present application is based upon and claims the benefit of priority to Japanese Patent Application No. 2021-030295, filed Feb. 26, 2021, the entire contents of which are incorporated herein by reference.

BACKGROUND OF THE INVENTION

Field of the Invention

The present invention relates to a robot control system, a robot controller, and a robot control method.

Description of Background Art

Japanese Patent Application Laid-Open Publication No. 2018-051653 describes a display system in which, when a worker teaches a robot a target position, an expected trajectory of the robot to the target position at a branch destination specified by pre-reading a control program is calculated, and an image showing the expected trajectory and an image of the robot are superimposed on a head-mounted display of the worker. The entire contents of this publication are incorporated herein by reference.

SUMMARY OF THE INVENTION

According to one aspect of the present invention, a robot control system includes robot controller circuitry that controls a robot, and host controller circuitry that communicates with the robot controller circuitry. The host controller circuitry further executes a control program, and transmits a command according to an execution result of the control program to the robot controller circuitry, and the robot controller circuitry further receives the command from the host controller circuitry, and executes pre-processing according to the command.

According to another aspect of the present invention, a robot controller for controlling a robot includes processing circuitry that identifies a code to be executed; and executes pre-processing according to the identified code in a robot program.

According to yet another aspect of the present invention, a robot control method is implemented on robot controller circuitry and host controller circuitry, the robot controller circuitry controls a robot and the host controller circuitry communicates with the robot controller circuitry, and the robot control method includes executing, at the host controller circuitry, a control program, transmitting, from the host controller circuitry, a command according to an execution result of the control program to the robot controller circuitry, receiving, at the robot controller circuitry, the command from the host controller circuitry, and executing, at the robot controller circuitry, pre-processing according to the command.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
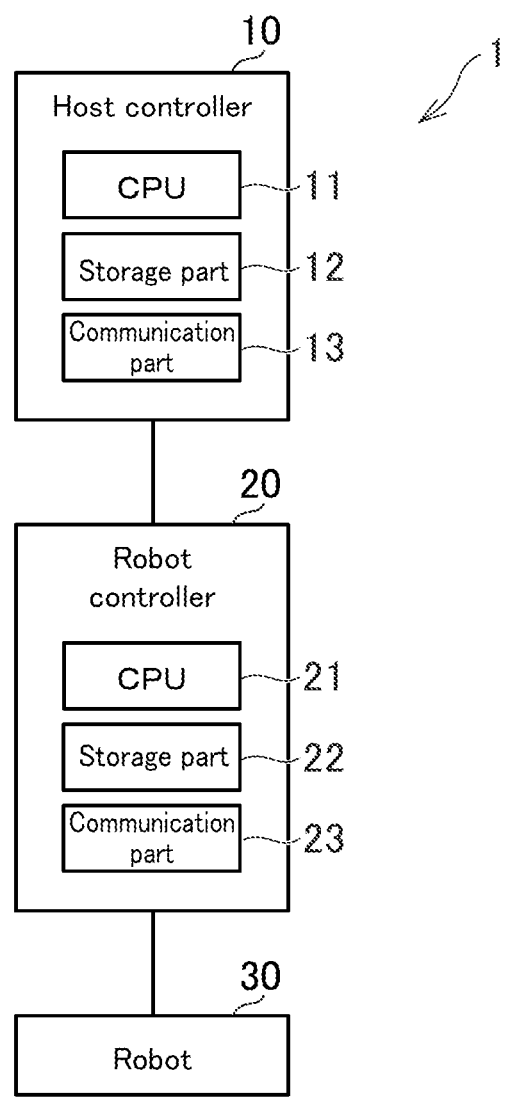
FIG. 1 illustrates an example of an overall structure of a robot control system.

Embodiments will now be described with reference to the accompanying drawings, wherein like reference numerals designate corresponding or identical elements throughout the various drawings.

1. First Embodiment

In the following, an example of a first embodiment of a robot control system according to the present invention is described.

1-1. Overall Structure of Robot Control System

FIG. 1 illustrates an example of an overall structure of a robot control system. As illustrated in FIG. 1, a robot control system 1 includes a host controller 10 and a robot controller 20. The host controller 10 and the robot controller 20 are connected to each other by any network such as a field network (industrial network).

The host controller 10 is a device that can communicate with the robot controller 20. The host controller 10 may communicate with multiple robot controllers 20 or may communicate with other devices such as a motor controller or a servo amplifier. For example, the host controller 10 is a PLC (Programmable Logic Controller). The host controller 10 may be another device such as an industrial PC, a personal computer, or a server computer.

The host controller 10 includes a CPU 11, a storage part 12, and a communication part 13. The CPU 11 includes at least one processor. The CPU 11 is a type of circuitry. The storage part 12 includes at least one of a volatile memory and a non-volatile memory. The communication part 13 includes at least one of a communication interface for wired communication and a communication interface for wireless communication.

The robot controller 20 is a device that can control a robot 30. The robot controller 20 includes a CPU 21, a storage part 22, and a communication part 23. Physical structures of the CPU 21, the storage part 22, and the communication part 23 may be respectively the same as those of the CPU 11, the storage part 12, and the communication part 13. The robot 30 may be of various types, and, for example, performs processing with respect to a workpiece, a measurement of a material, or an inspection of a product.

Programs and data stored in the storage parts (12, 22) may be supplied via a network. Further, the hardware structures of the devices are not limited to those of the above examples, and various hardware structures can be adopted. For example, a reading part (such as a memory card slot) that reads a computer-readable information storage medium or an input-output part (such as a USB terminal) for connecting to an external device may be included. In this case, a program or data stored in the information storage medium may be supplied via the reading part or the input-output part. In addition, for example, a circuit called an FPGA or an ASIC may be included, and any sensor such as a torque sensor, a motor encoder, a motion sensor, or a vision sensor may be connected.

1-2. Overview of Robot Control System

The host controller 10 transmits a command for controlling the robot 30 to the robot controller 20 based on a control program. An order of commands to be transmitted to the robot controller 20 is defined in the control program. In the first embodiment, a case is described where the control program is created using the ladder language. However, the control program can be created using any language such as the robot language or the C language.

The robot controller 20 controls the robot 30 based on a command received from the host controller 10. In the first embodiment, as an example of this command, a movement command for operating the robot 30 to a predetermined position is described. The movement command includes a target position of the robot 30. The target position is a movement destination position of the robot 30. The target position is a position taught by a user in advance. The target position may be calculated based on information acquired by a vision sensor or a camera. The target position is indicated by coordinates of a coordinate system set in the robot 30. This coordinate system may be any coordinate system, and may be defined, for example, by the user. The movement command may include multiple target positions. The movement command may include other information such as a movement speed of the robot 30.

Upon receiving the movement command from the host controller 10, the robot controller 20 calculates a trajectory to the target position included in the movement command. The calculation of this trajectory often takes some time. Further, the transmission of the movement command from the host controller 10 to the robot controller 20 also takes some time. Therefore, when the robot 30 is controlled using a conventional robot control method, the speed of the robot 30 may decrease.

Figure 2:
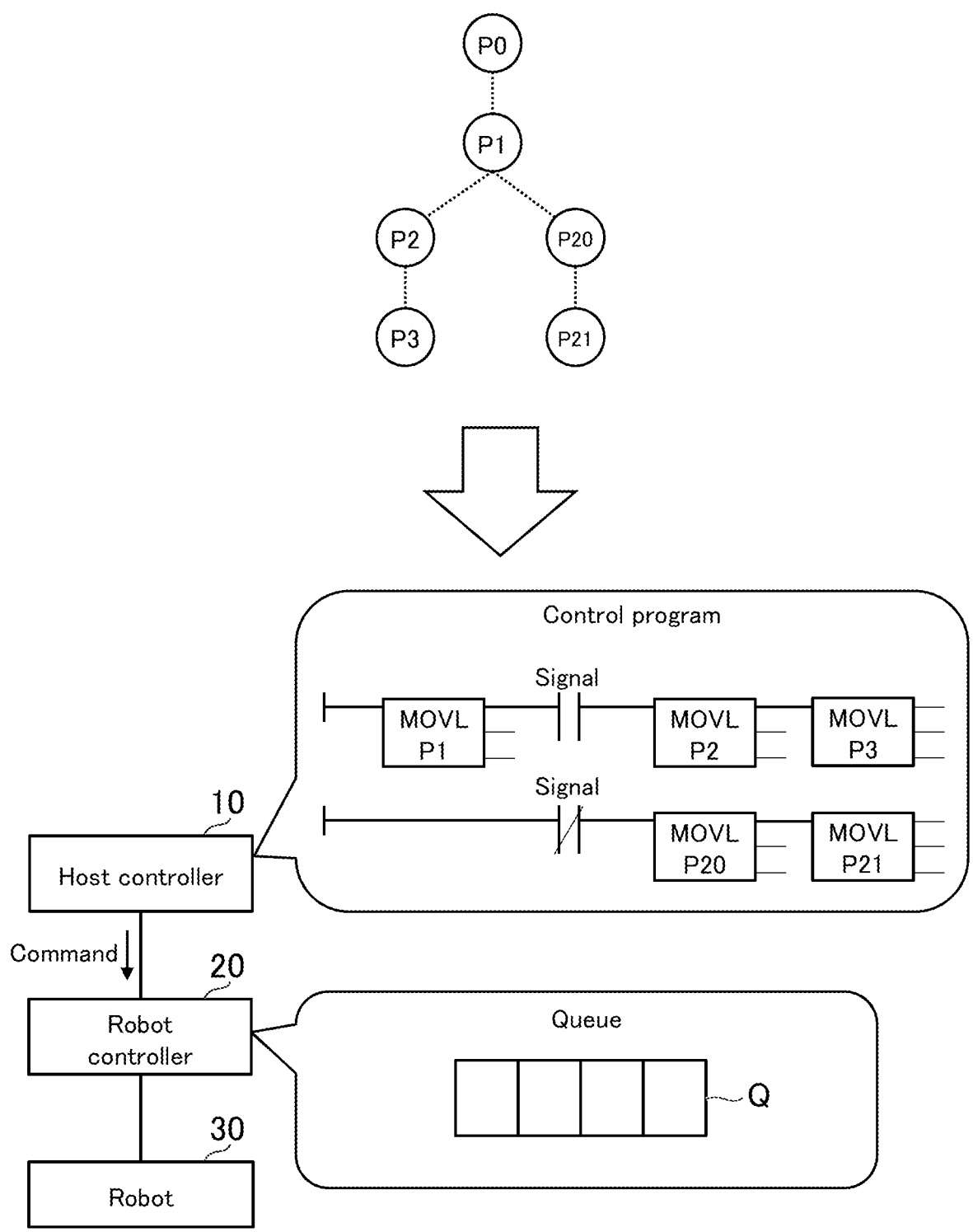
FIG. 2 illustrates an example of a robot control method.
Figure 3:
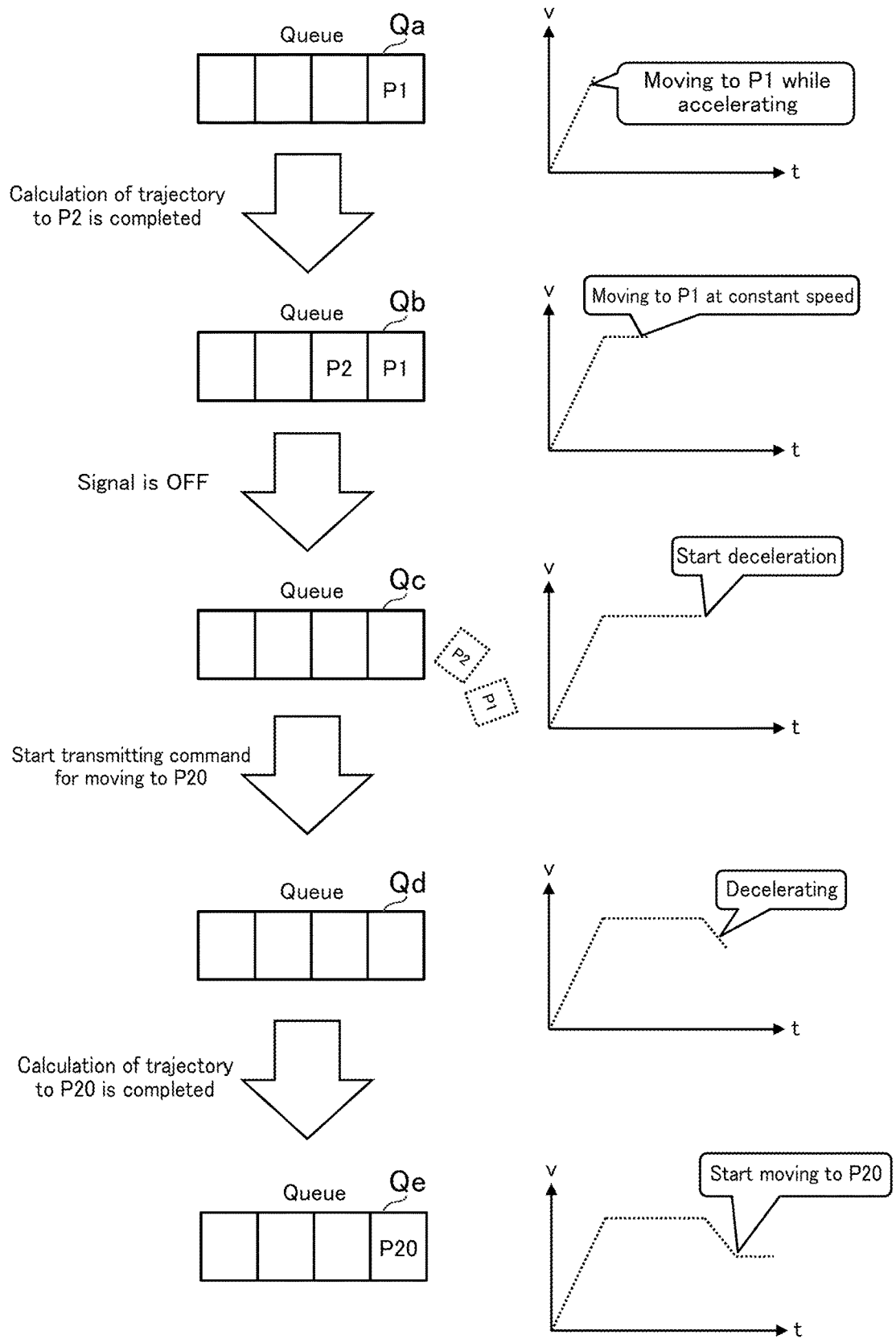
FIG. 3 illustrates an example of a robot control method.

FIGS. 2 and 3 illustrate an example of a robot control method. An order of target positions of the robot 30 as illustrated in FIG. 2 is defined in a control program stored by the host controller 10. In the example of FIG. 2, an initial position of the robot 30 is a position (P0). The initial position is a position of the robot 30 before a series of operations is started. The robot 30 starts moving from the position (P0) and moves in an order of positions (P1, P2, P3).

Until the robot 30 arrives at the position (P1), when a predetermined signal changes from ON to OFF, the robot 30 moves in an order of positions (P20, P21) after arriving at the position (P1). Instead of a signal, a value of a register holding a certain particular value may be used. When the signal is ON, the logic of a contact point (A) of "Signal" on a right side of "MOVL P1" of the first line in FIG. 2 is true. Therefore, function blocks from "MOVL P2" to "MOVL P3" are executed. "Signal" of the second line is referenced by a contact point (B) (negative logic) and thus is false when the signal is ON, and "MOVL P20" and "MOVL P21" to the right of the contact point (B) are not executed.

On the other hand, during operation, when a condition that the trajectory of the robot 30 needs to be changed is satisfied and the signal changes from ON to OFF due to a program (not illustrated in the drawings) or due to a change in a state of a signal of an external sensor, the contact point (A) of "Signal" of the first line in FIG. 2 becomes false, and "MOVL P2" and "MOVL P3" are not executed. At the same time, the contact point (B) of "Signal" of the second line becomes true, and thus, "MOVL P20" and "MOVL P21" are executed. "Be executed" means that transmission of a command is performed for the time being by an internal logic of these function blocks.

When the control program is executed, the host controller 10 transmits a command for moving to the position (P1) to the robot controller 20. Upon receiving this movement command, the robot controller 20 calculates a trajectory to the position (P1) and stores the trajectory in a queue (Q). The queue (Q) is a storage area in the storage part 22 of the robot controller 20. Information about control contents of the robot 30 by the robot controller 20 is sequentially stored in the queue (Q). The robot controller 20 controls the robot 30 by sequentially reading out the information in the queue (Q). The queue (Q) can also store other information such as the speed of the robot 30. The information stored in the queue (Q) is updated depending on a situation.

In FIG. 3, changes in the information in the queue (Q) are distinguished by adding a lowercase alphabet to the end of the reference symbol "Q." FIG. 3 illustrates time series variation of the speed of the robot 30. These points also apply to FIG. 5 to be described later. When the trajectory to the position (P1) is stored in the queue (Q), the robot controller 20 causes the robot 30 to move toward the position (P1) while accelerating the robot 30 such that the robot 30 moves on this trajectory (the state of the queue (Qa) in FIG. 3).

The host controller 10 transmits a command for moving to the position (P2) to the robot controller 20 before the robot 30 arrives at the position (P1). For example, upon receiving this movement command, the robot controller 20 calculates a trajectory to the position (P2) and adds the trajectory to the queue (Q) (the state of the queue (Qb) in FIG. 3). At this point, the robot 30 has not arrived at the position (P1), and thus, the trajectory to the position (P2) is stored after the trajectory to the position (P1).

When the signal changes from ON to OFF before the robot 30 arrives at the position (P1), since the robot 30 needs to be moved to the position (P20), the calculated trajectories are discarded (the state of the queue (Qc) in FIG. 3). When the calculated trajectories are discarded, the robot controller 20 starts decelerating the robot 30 in order to stop the robot 30. Since the case is described where the robot 30 moves to the position (P1) and then moves to the position (P20), the trajectory to the position (P1) may be discarded after the robot 30 arrives at the position (P1).

The host controller 10 starts transmitting a command for moving to the position (P20) to the robot controller 20 (the state of the queue (Qd) in FIG. 3). Upon receiving this movement command, the robot controller 20 starts calculating a trajectory to the position (P20). During the reception of this movement command and during the calculation of this trajectory, the robot 30 continues to decelerate.

When the calculation of the trajectory to the position (P20) is completed, the robot controller 20 adds the trajectory to the queue (Q) (the state of the queue (Qe) in FIG. 3). The robot controller 20 causes the robot 30 to start moving to the position (P20) such that the robot 30 moves on this trajectory. During this, the host controller 10 may transmit a command for moving to the position (P21) to the robot controller 20. In this case, a trajectory to the position (P21) is calculated and is stored after the trajectory to the position (P20).

When the trajectory to the position (P20) is stored in the queue (Q), the robot 30 starts moving toward the position (P20) at a constant speed. When the speed of the robot 30 is below a predetermined speed, the robot controller 20 needs to accelerate the robot 30 again. In this way, in the conventional robot control, the reception of the movement command and the calculation of the trajectory after the signal changes from ON to OFF take time, and thus, there is a possibility that the robot 30 slows down.

Therefore, the host controller 10 of the first embodiment transmits calculation commands for calculating the trajectory to the position (P20) and the trajectory to the position (P21) to the robot controller 20 before transmitting a command for moving to the position (P2). The trajectories calculated by the calculation commands are not used until the signal changes from ON to OFF. As a result, when the signal changes from ON to OFF, the robot 30 immediately starts moving to the position (P20).

Figure 4:
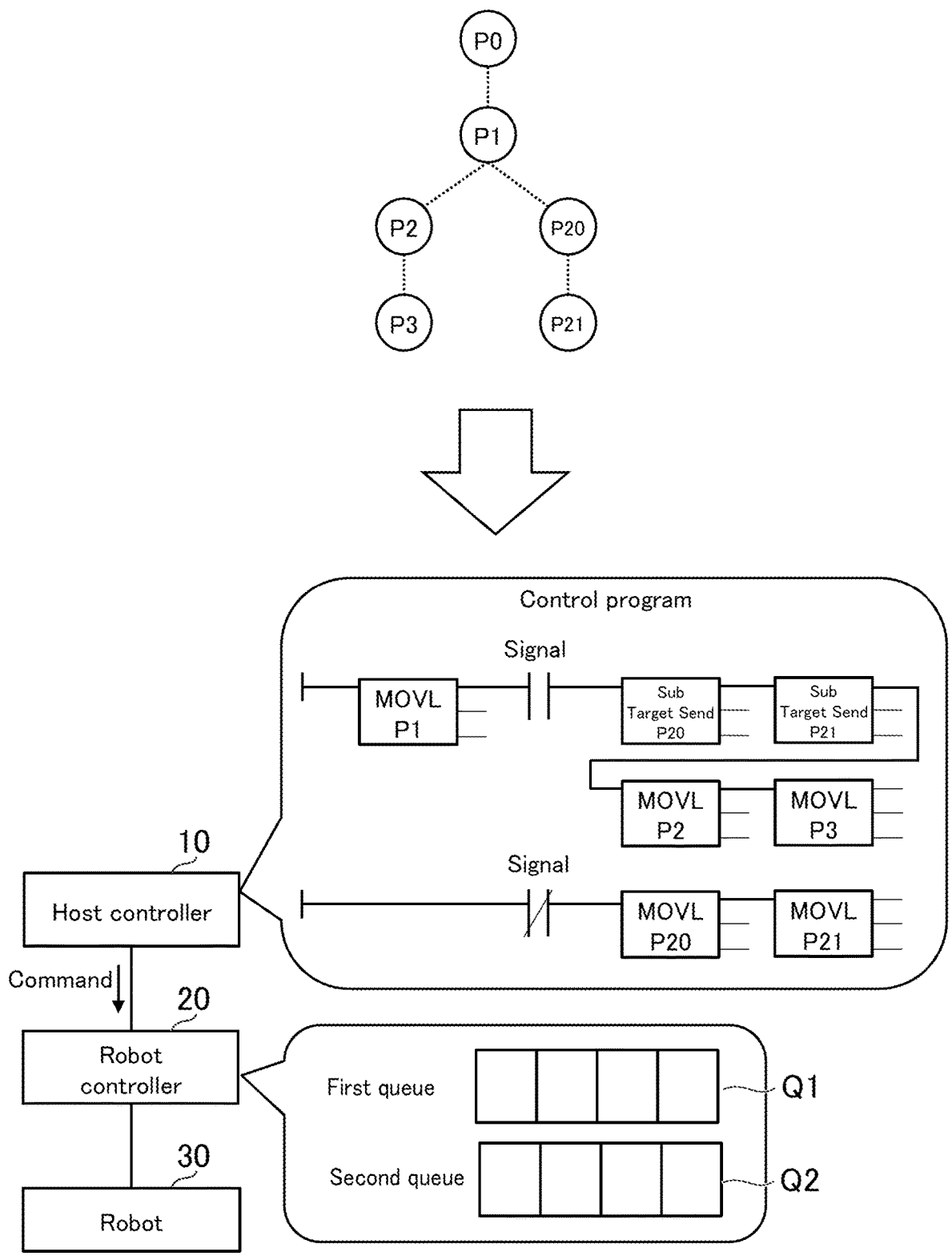
FIG. 4 illustrates an example of robot control in a first embodiment.
Figure 5:
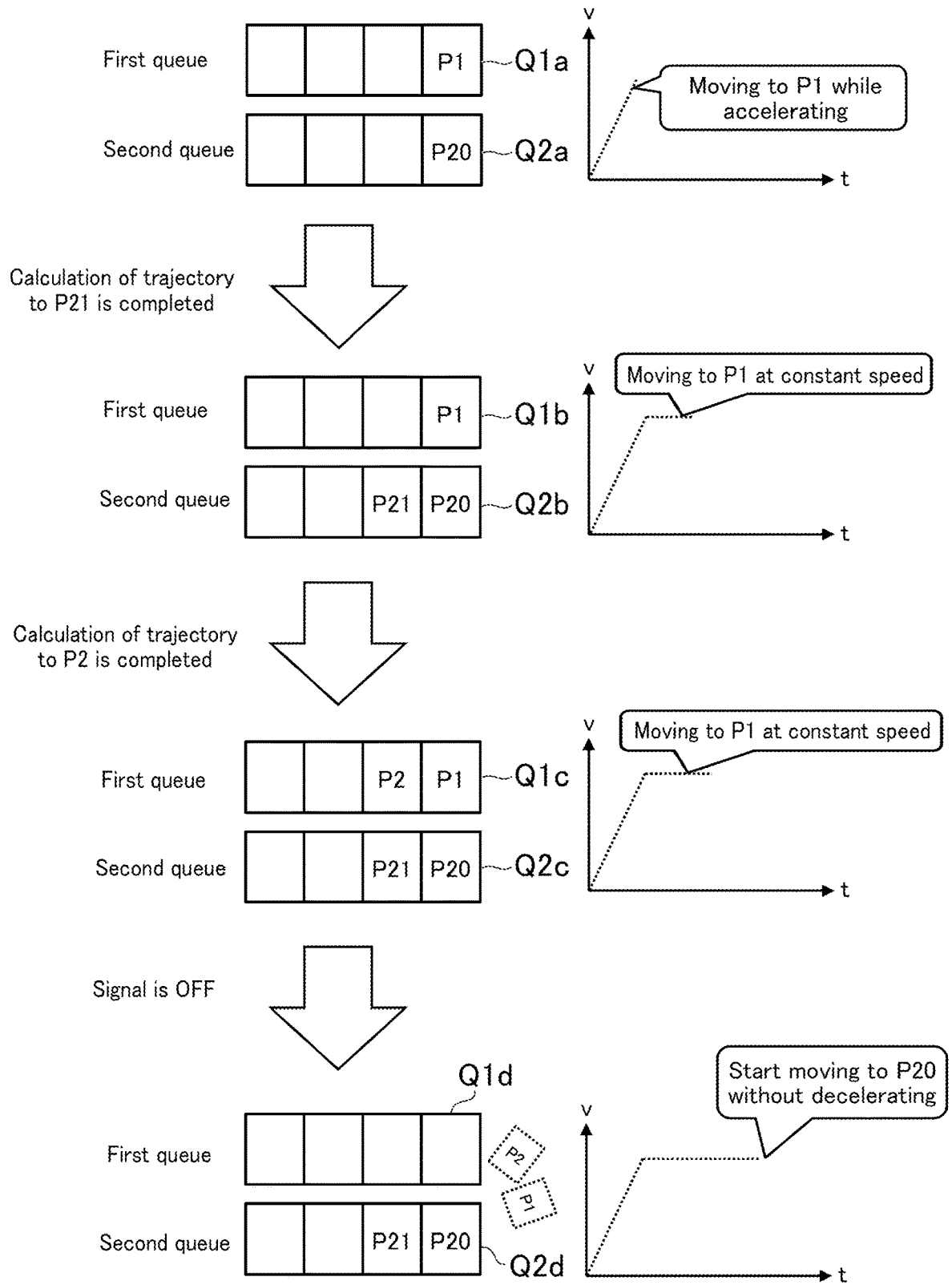
FIG. 5 illustrates an example of robot control in the first embodiment.

FIGS. 4 and 5 illustrate an example of robot control in the first embodiment. As illustrated in FIG. 4, in the control program, after the command for moving to the position (P1), the calculation command of the trajectory to the position (P20) and the calculation command of the trajectory to the position (P21) are transmitted. After that, a command for moving to the position (P2) and a command for moving to the position (P3) are transmitted. In the example of FIG. 4, a calculation command is described as "Sub Target Send." The movement command is described as "MOVL."

The robot controller 20 includes a first queue (Q1) and a second queue (Q2). The first queue (Q1) stores the trajectories to the positions (P1)-(P3). The second queue (Q2) stores the trajectories to the positions (P20, P21). The second queue (Q2) can be said to be a queue for pre-calculated trajectories, or a queue for when the signal changes from ON to OFF. When the signal changes from ON to OFF in response to occurrence of some anomaly, the first queue (Q1) can be said to be a queue of a normal system or a usual system, and the second queue (Q2) can also be said to be a queue of an abnormal system or a spare system.

For example, when the control program is executed, the host controller 10 transmits a command for moving to the position (P1) to the robot controller 20. Upon receiving this command, the robot controller 20 calculates the trajectory to the position (P1) and stores the trajectory in the first queue (Q1). When the trajectory to the position (P1) is stored in the first queue (Q1), the robot controller 20 causes the robot 30 to move toward the position (P1) while accelerating the robot 30 such that the robot 30 moves on this trajectory.

The host controller 10 transmits a calculation command of the trajectory to the position (P20) to the robot controller 20 before the robot 30 arrives at the position (P1). Upon receiving this calculation command, the robot controller 20 pre-calculates the trajectory to the position (P20) and stores the trajectory in the second queue (Q2) (the states of the first queue (Q1a) and the second queue (Q2a) in FIG. 5). At this point, it is assumed that the robot 30 is accelerating and moving towards the position (P1).

The host controller 10 transmits a calculation command of the trajectory to the position (P21) to the robot controller 20. For example, upon receiving this calculation command, the robot controller 20 calculates the trajectory to the position (P21) and stores the trajectory in the second queue (Q2) (the states of the first queue (Q1b) and second queue (Q2b) in FIG. 5). At this point, it is assumed that the robot 30 is moving toward the position (P1) at a constant speed.

The host controller 10 transmits a command for moving to the position (P2) to the robot controller 20. Upon receiving this command, the robot controller 20 calculates the trajectory to the position (P2) and stores the trajectory in the first queue (Q1) (the states of the first queue (Q1c) and the second queue (Q2c) in FIG. 5). At this point, it is assumed that the robot 30 is moving toward the position (P1) at a constant speed.

In this state, when the signal changes from ON to OFF, since the robot 30 needs to be moved to the position (P20), the host controller 10 transmits a command for moving to the position (P20) to the robot controller 20. However, since the trajectory to the position (P20) has already been calculated, this movement command does not have to include the coordinates of the position (P20).

When the signal changes from ON to OFF and a command for moving to the position (P20) is received, the robot controller 20 discards the content of the first queue (Q1) and switches from a state of being controlled based on the first queue (Q1) to a state of being controlled based on the second queue (Q2) (the states of the first queue (Q1d) and the second queue (Q2d) in FIG. 5). Since the trajectory to the position (P20) has been calculated, the robot 30 can immediately start moving to the position (P20). When the signal does not change from ON to OFF, the content of the second queue (Q2) may be discarded.

As described above, the robot control system 1 of the first embodiment causes the robot controller 20 to pre-calculate a trajectory to a target position where the robot 30 is to move to when the signal changes from ON to OFF. As a result, when the signal actually changes from ON to OFF, the robot 30 can immediately start moving. Therefore, deceleration of the robot 30 is prevented and the processing speed in robot control is improved. In the following, details of the robot control system 1 of the first embodiment are described.

1-3. Functions Realized by First Embodiment

Figure 6:
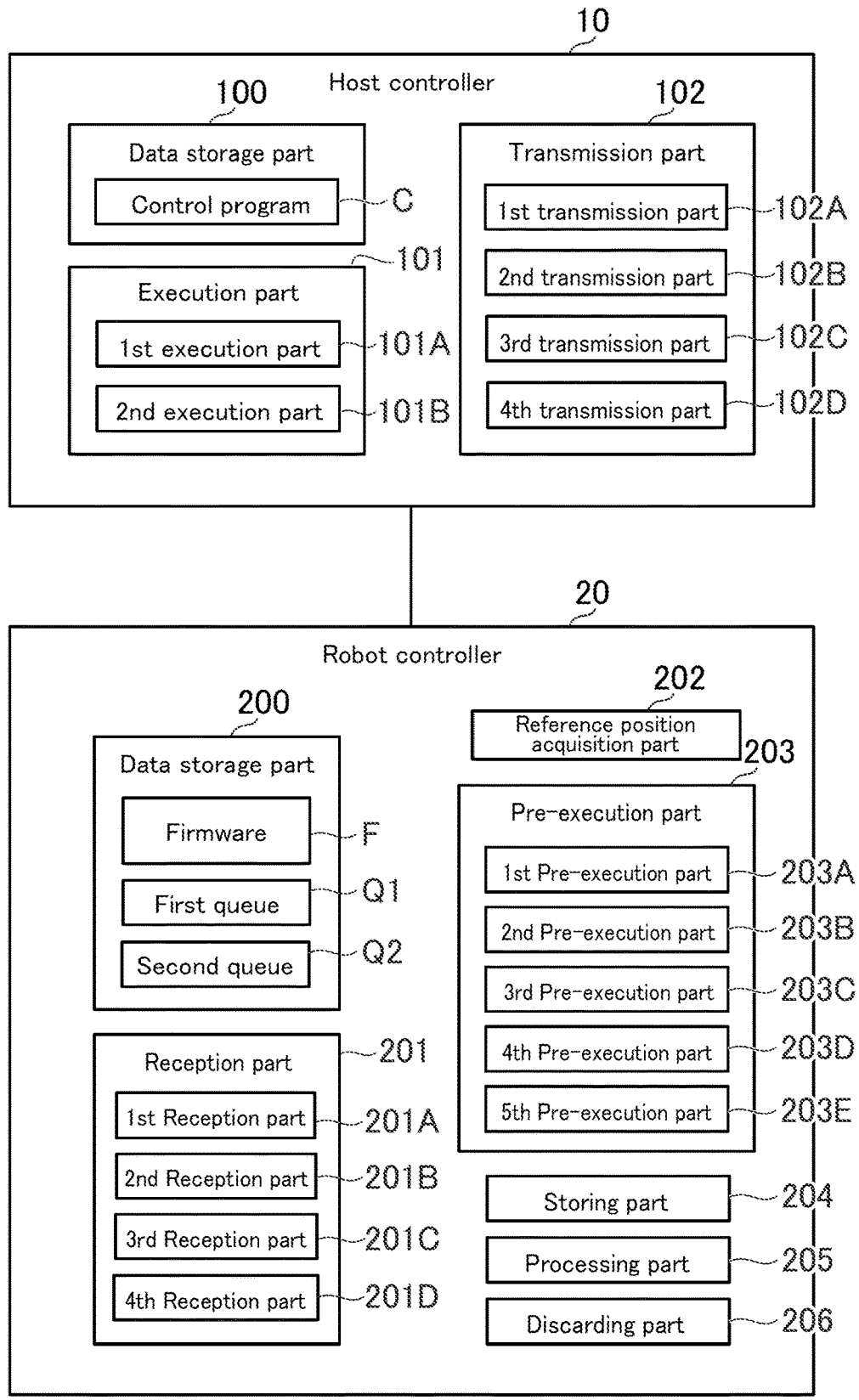
FIG. 6 is a functional block diagram illustrating an example of functions realized by a robot control system of the first embodiment.

FIG. 6 is a functional block diagram illustrating an example of functions realized by the robot control system 1 of the first embodiment.

1-3-1. Functions Realized by Host Controller

The host controller 10 includes a data storage part 100, an execution part 101, and a transmission part 102. The data storage part 100 is mainly realized by the storage part 12. The execution part 101 and the transmission part 102 are mainly realized by the CPU 11.

Data Storage Part

The data storage part 100 stores data required for controlling the robot controller 20. For example, the data storage part 100 stores a control program (C) that defines control procedures of the robot controller 20, and variables referenced by the control program (C). There may be multiple sets of control programs (C) and variables.

The control program (C) contains codes for transmitting multiple commands in a predetermined order. In the first embodiment, information transmitted over a network is described as a command, and information contained in a program is described as codes. The codes are not limited to codes that can be visually understood by the user, but also include codes converted into a machine language. For example, in a case of a control program (C) that requires conversion such as compilation, a symbol string converted into a machine language corresponds to a code. In a case of an interpreted control program (C), a symbol string such as "MOVL" entered by the user corresponds to the codes. Symbols included in a symbol string include not only letters but also other symbols such as numbers.

In the first embodiment, the control program (C) has a conditional branching. A conditional branching is that a subsequent processing content changes depending on whether or not a predetermined condition is satisfied. A conditional branching can be expressed in any way. For example, a conditional branching may be expressed using a contact point or a comparison command in the case of the ladder language, or may be expressed using an IF statement or a SWITCH statement in a case of another language. A conditional branching has multiple branch destinations. For each branch destination, there is a code group indicating processing of the branch destination.

In the example of FIG. 4, that the signal changes from ON to OFF corresponds to a condition of a conditional branching. For example, when a user creates a control program (C) using the ladder language, the user uses a contact point or a comparison command to express that the signal changes from ON to OFF as a conditional branching. The user writes codes for each of the command for moving to the position (P2) and the command for moving to the position (P3) as a first branch destination after that, and writes codes for each of the command for moving to the position (P20) and the command for moving to the position (P21) as a second branch destination. As described with reference to FIG. 4, after the command for moving to the position (P1), the user writes codes for each of the calculation command of the trajectory to the position (P20) and the calculation command of the trajectory to the position (P21).

A condition of a conditional branching is not limited to that the signal changes from ON to OFF, and may be any condition. For example, a condition of a conditional branching may be that the signal changes from OFF to ON, that a predetermined event occurs, that an alarm occurs, that a value of an internal calculation becomes a predetermined value, or that a predetermined situation is detected by a sensor. A situation detected by an input signal, an alarm, an internal calculation, or a sensor may be that of at least one of the host controller 10 and the robot controller 20 or may be that of other peripheral devices.

Further, it is also possible that the control program (C) does not have a conditional branching. For example, it is also possible that the control program (C) does not have a conditional branching such as an IF statement or a SWITCH statement, but has a JUMP statement or a GOTO statement and moves execution from a certain code to a specific label. It can be moved to after a JUMP statement or a GOTO statement, or can be moved to before a JUMP statement or a GOTO statement. Further, for example, it is also possible that the control program (C) does not have a conditional branching or a JUMP statement, and is executed in one direction from start to finish.

Execution Part

The execution part 101 executes the control program (C). When the execution part 101 references a certain code based on the control program (C), the execution part 101 references the next code at any timing. After referencing a certain code, the execution part 101 may immediately reference the next code, or may reference the next code after a certain time period. In the case of after a certain time period, the next code may be referenced after a certain time period has passed since a certain code is referenced, or the next code may be referenced when some response is received from the robot controller 20. A range of codes executed by the execution part 101 may be any range, and codes as far ahead as possible may be executed, or a maximum number of codes to be executed may be set. The execution part 101 can execute codes ahead of a part of the control program (C) corresponding to an operation being executed by the robot controller 20.

The execution part 101 of the first embodiment includes a first execution part (101A) and a second execution part (101B).

The first execution part (101A) executes specific codes in the control program (C). For example, the first execution part (101A) determines presence or absence of a specific code in the control program (C). A specific code is a code to be pre-processed. In the first embodiment, as an example of a specific code, a code for pre-calculating a trajectory is described. In the example of FIG. 4, the first execution part (101A) determines whether or not there is a code containing "Sub Target Send" in the control program (C).

A specific code may be any code and is not limited to the example of the first embodiment. For example, a specific code may be a code when a calculation amount of at least one of the host controller 10 and the robot controller 20 is equal to or more than a reference. Further, for example, a specific code may be a code when communication traffic between the host controller 10 and the robot controller 20 is equal to or more than a reference. Further, for example, a specific code may be a code indicating a conditional branching. Further, for example, a specific code may be a code for detecting a change of a signal.

The second execution part (101B) executes a control program (C) having a conditional branching. A code of a conditional branching is an example of the specific codes described above. The second execution part (101B) executes a code according to a branch destination of a conditional branching. In the example of FIG. 4, the second execution part (101B) executes the code of "Sub Target Send P20" and the code of "Sub Target Send P21" in order to perform advance preparations for the code of "MOVL P20" and the code of "MOVL P21" at the branch destinations of the conditional branching. When there are three or more branch destinations, similarly, the second execution part (101B) executes codes as advance preparations for codes of the branch destinations.

Transmission Part

The transmission part 102 transmits a command according to an execution result of the control program (C) by the execution part 101 to the robot controller 20. The transmission part 102 transmits a command according to a code of the control program. For example, when a code for pre-calculating a trajectory is executed, the transmission part 102 transmits a calculation command according to the code. Further, for example, when a code for causing the robot 30 to move to a predetermined position is executed, the transmission part 102 transmits a movement command according to the code. When an executed code is a code of internal processing of the host controller 10, no command needs to be particularly transmitted.

The transmission part 102 of the first embodiment includes a first transmission part (102A), a second transmission part (102B), a third transmission part (102C), and a fourth transmission part (102D).

The first transmission part (102A) transmits a specific command according to a specific code executed by the first execution part (101A) to the robot controller 20. A specific command is a command transmitted to the robot controller 20 when the host controller 10 executes a specific code. When a specific code includes a specific command, the first transmission part (102A) may transmit the specific command included in the specific code. When it is necessary to generate a specific command from a specific code, the first transmission part (102A) may generate and transmit the specific command based on the specific code.

The second transmission part (102B) transmits a branch destination command according to a branch destination of a conditional branching of the control program (C) to the robot controller 20. A branch destination command is a command for advance preparation of a branch destination. In the example of FIG. 4, "Sub Target Send P20" and "Sub Target Send P21" for pre-calculating a trajectory of the robot 30 when the signal changes from ON to OFF correspond to branch destination commands. Branch destination commands are not limited to the examples of the first embodiment. When "Sub Target Send" is not described after "MOVL P1" as in FIG. 4, commands according to a part of "MOVL P20" and "MOVL P21" (commands that only transmit target positions) to be executed after the signal changes from ON to OFF may correspond to branch destination commands.

The third transmission part (102C) transmits a calculation command for calculating a trajectory of the robot 30 to a target position to the robot controller 20. In the example of FIG. 4, "Sub Target Send P20" and "Sub Target Send P21" correspond to calculation commands. A calculation command may be a command that can be identified as a pre-calculation of a trajectory, and may be a command expressed by other symbol strings.

The fourth transmission part (102D) transmits to the robot controller, according to an execution result of the control program (C), a first calculation command for calculating a first trajectory to a first target position of the robot, and a second calculation command for calculating a second trajectory when the robot moves to a second target position, which is different from the first target position. For example, the first target position and the second target position are respectively included in the commands from the host controller 10. The second trajectory may be a trajectory different from the first trajectory. The first calculation command and the second calculation command may each be a command for executing only a calculation of a trajectory, or may be command for calculating a trajectory and moving on the trajectory. Therefore, the first calculation command and the second calculation command may each be any one of a movement command and a calculation command described with reference to FIG. 4.

In the example of FIG. 4, the positions (P2, P3) are each an example of the first target position, and the trajectories to the positions (P2, P3) are each an example of the first trajectory. The positions (P20, P21) are each an example of the second target position, and the trajectories to the positions (P20, P21) are each an example of the second trajectory. "MOVL P2" and "MOVL P3" are each an example of the first calculation command, and "Sub Target Send P20" and "Sub Target Send P21" are each an example of the second calculation command.

1-3-2. Functions Realized by Robot Controller

In the robot controller 20, a data storage part 200, a reception part 201, a reference position acquisition part 202, a pre-execution part 203, a storing part 204, a processing part 205, and a discarding part 206 are realized. The data storage part 200 is mainly realized by the storage part 22. The reception part 201, the reference position acquisition part 202, the pre-execution part 203, the storing part 204, the processing part 205, and the discarding part 206 are mainly realized by the CPU 21.

Data Storage Part

The data storage part 200 stores data required for controlling the robot 30. For example, the data storage part 200 stores firmware (F) for interpreting and executing commands received from the host controller 10, and variables. The firmware (F) indicates a processing content to be executed when a command is received from the host controller 10. That is, a relationship between a command from the host controller 10 and processing to be executed by the robot controller 20 is defined in the firmware (F). The data storage part 200 also stores a program or the like required for calculation of a trajectory.

Reception Part

The reception part 201 receives various commands from the host controller 10. The reception part 201 receives a command according to an execution result of the control program. The reception part 201 may receive not only a command for advance preparation of a certain command, but also receives a command that is not advance preparation. For reception of a command, either synchronous communication or asynchronous communication may be used, and either constant-period communication or non-constant-period communication may be used.

The reception part 201 of the first embodiment includes a first reception part (201A), a second reception part (201B), a third reception part (201C), and a fourth reception part (201D).

The first reception part (201A) receives a specific command transmitted by the first transmission part (102A) from the host controller 10. The second reception part (201B) receives a branch destination command transmitted by the second transmission part (102B) from the host controller 10. The third reception part (201C) receives a calculation command transmitted by the third transmission part (102C) from the host controller 10. The fourth reception part (201D) receives a first calculation command and a second calculation command transmitted by the fourth transmission part (102D) from the host controller. Details of these commands are as described above.

Reference Position Acquisition Part

The reference position acquisition part 202 acquires a reference position of a trajectory on which the robot 30 moves. A reference position is a position as a reference when a trajectory is calculated. For example, a reference position is a position that is a starting point (origin) of a trajectory. When a trajectory from a position when a certain condition is satisfied is calculated or multiple trajectories are calculated, a reference position may be a position slightly after a starting point. A reference position may be included in a command from the host controller 10, or may be a current position of the robot 30 detected by a motion sensor or the like. A reference position may be stored in the data storage part 200 or may be stored in the first queue (Q1) or the second queue (Q2).

In the example of FIG. 4, the reference position of the trajectory to the position (P1) is the position (P0). The reference position of the trajectory to the position (P2) is the position (P1). The reference position of the trajectory to the position (P3) is the position (P2). The reference position of the trajectory to the position (P20) is the position (P1). The reference position of the trajectory to the position (P21) is the position (P20). In the first embodiment, these reference positions are each included in a movement command or a calculation command.

For example, the reference position acquisition part 202 acquires a first reference position of the robot 30 according to a first trajectory and a second reference position of the robot 30 according to a second trajectory. In the example of FIG. 4, since the trajectory to the position (P2) corresponds to a first trajectory, the reference position acquisition part 202 acquires the position (P1) as the first reference position of this trajectory. Since the trajectory to the position (P20) corresponds to a second trajectory, the reference position acquisition part 202 acquires the position (P1) as the second reference position of this trajectory.

The first reference position and the second reference position may be different from each other. For example, since the trajectory to the position (P3) also corresponds to a first trajectory, the reference position acquisition part 202 acquires the position (P2) as the first reference position of this trajectory. Since the trajectory to the position (P21) also corresponds to a second trajectory, the reference position acquisition part 202 acquires the position (P20) as the second reference position of this trajectory. These reference positions may be specified by a user from an operating device (so-called programming pendant).

Pre-Execution Part

The pre-execution part 203 executes pre-processing according to a command received by the reception part 201. Pre-processing is processing that corresponds to preparation for certain processing. For example, pre-processing is processing to generate in advance information to be used in certain processing, processing to execute in advance a part or all of calculation required for certain processing, processing to put in advance a peripheral device required for certain processing on standby, processing to read out in advance a program or a parameter required for certain processing, or processing to measure in advance a physical quantity required for certain processing. In the first embodiment, pre-calculating a trajectory corresponds to pre-processing.

The pre-execution part 203 of the first embodiment includes a first pre-execution part (203A), a second pre-execution part (203B), a third pre-execution part (203C), a fourth pre-execution part (203D), and a fifth pre-execution part (203E).

The first pre-execution part (203A) executes pre-processing according to a specific command received by the first reception part (201A). Pre-processing to be executed when a specific command is received is defined in the firmware (F). The first pre-execution part (203A) identifies pre-processing according to a received specific command and executes the pre-processing. In the example of FIG. 4, when "Sub Target Send P20" and "Sub Target Send P21," which are specific commands, are received, the first pre-execution part (203A) calculates trajectories to target positions included in these commands.

The second pre-execution part (203B) executes pre-processing according to a branch destination command received by the second reception part (201i). Pre-processing to be executed when a branch destination command is received is defined in the firmware (F). The second pre-execution part (203B) identifies pre-processing according to a received branch destination command and executes the pre-processing. In the example of FIG. 4, the second pre-execution part (203B) executes pre-calculation of trajectories according to "Sub Target Send P20" and "Sub Target Send P21," which are branch destination commands.

The third pre-execution part (203C) executes pre-calculation of a trajectory according to a calculation command received by the third reception part (201C). Pre-calculation (algorithm or the like for trajectory calculation to be used) to be executed when a calculation command is received is defined in the firmware (F). The third pre-execution part (203C) identifies pre-calculation according to a received calculation command and executes the pre-calculation. In the example of FIG. 4, the third pre-execution part (203C) executes pre-calculation of trajectories according to "Sub Target Send P20" and "Sub Target Send P21," which are calculation commands.

The fourth pre-execution part (203D) executes pre-calculation of a first trajectory according to a first calculation command received by the fourth reception part (201D), and pre-calculation of a second trajectory according to a second calculation command received by the fourth reception part (201D). In the example of FIG. 4, the fourth pre-execution part (203D) executes pre-calculation of first trajectories according to "MOVL P2" and "MOVL P3," which are first calculation commands. The fourth pre-execution part (203D) executes pre-calculation of second trajectories according to "Sub Target Send P20" and "Sub Target Send P21," which are second calculation commands.

The fifth pre-execution part (203E) executes pre-calculation of a first trajectory from a first reference position to a first target position and pre-calculation of a second trajectory from a second reference position to a second target position. In the example of FIG. 4, the fifth pre-execution part (203E) executes pre-calculation of first trajectories according to "MOVL P2" and "MOVL P3," which include first target positions. The fifth pre-execution part (203E) executes pre-calculation of second trajectories according to "Sub Target Send P20" and "Sub Target Send P21," which include second target positions.

Storing Part

The storing part 204 stores an execution result of pre-processing in a storage area according to a command received from the host controller 10 among multiple storage areas. In the first embodiment, the first queue (Q1) and the second queue (Q2) are each an example of a storage area. A storage area may be a predetermined area in a memory and may be called by a name other than a queue. For example, a storage area may be a register band of addresses from a certain address to after a predetermined address.

In the first embodiment, the storing part 204 stores in the first queue (Q1) a calculation result of pre-calculation of a first trajectory when the signal has not changed from ON to OFF, and stores in the second queue (Q2) a calculation result of pre-calculation of a second trajectory when the signal has changed from ON to OFF. Whether a calculation result is to be stored in the first queue (Q1) or the second queue (Q2) can be determined using any method, and, for example, may be defined in the firmware (F).

For example, a relationship between a type of a command and whether a calculation result is to be stored in the first queue (Q1) or the second queue (Q2) may be determined in advance. The storing part 204 stores a calculation result in the first queue (Q1) in the case of "MOVL," which is a movement command. The storing part 204 stores a calculation result in the second queue (Q2) in the case of "Sub Target Send," which is a calculation command. However, when a command of "MOVL" for moving to a target position in a trajectory stored in the second queue (Q2) is received, since the trajectory stored in the second queue (Q2) has already been calculated, movement control based on this trajectory is executed.

Processing Part

Based on a command received from the host controller 10, the processing part 205 executes processing according to the command. Processing executed by the processing part 205 is different from pre-processing executed by the pre-execution part 203. The processing part 205 may execute processing that requires pre-processing, or may execute processing that does not require pre-processing.

For example, the processing part 205 executes processing according to a command received from the host controller 10 based on an execution result of pre-processing stored in a storage area according to the command received from the host controller 10. This command is a command that instructs execution of processing that requires pre-processing. In the example of FIG. 4, "MOVL P20" and "MOVL P21" correspond to processing that requires pre-processing.

For a command that does not require pre-processing ("MOVL P1" in the example of FIG. 4), the processing part 205 executes processing according to the command without particularly using any pre-processing. "MOVL P2" and "MOVL P3" are commands that do not require pre-processing. However, when "MOVL P1" is being executed, calculation of the trajectory to the position (P2) and calculation of the trajectory to the position (P3) are executed as pre-processing. This pre-processing may be executed by the pre-execution part 203 or may be executed by the processing part 205.

The processing part 205 determines whether or not to execute processing that requires pre-processing based on a command received from the host controller 10. When it is determined to execute processing that requires pre-processing, the processing part 205 executes the processing based on an execution result of the pre-processing. In the example of FIG. 4, when "MOVL P20" and "MOVL P21" are received, the processing part 205 controls the robot 30 to move on the pre-calculated trajectory. Whether or not it is processing that requires pre-processing is defined in the firmware (F).

Discarding Part

The discarding part 206 discards an execution result of pre-processing when a command different from a command that requires pre-processing is executed. This different command is a command that does not require pre-processing. In the example of FIG. 4, when the robot controller 20 receives the command of "MOVL P2" or "MOVL P3," since the trajectories to the position (P20) and the position (P21) are no longer necessary, when these commands are received, the discarding part 206 discards the calculation results of the trajectories held in the second queue (Q2). "Discarding" may mean erasing data from a storage area, or may mean making the data overwritable while leaving the data in the storage area. Making a storage area in which an execution result of pre-processing is stored available for other purposes may correspond to "discarding."

1-4. Processing Executed in First Embodiment

Figure 7:
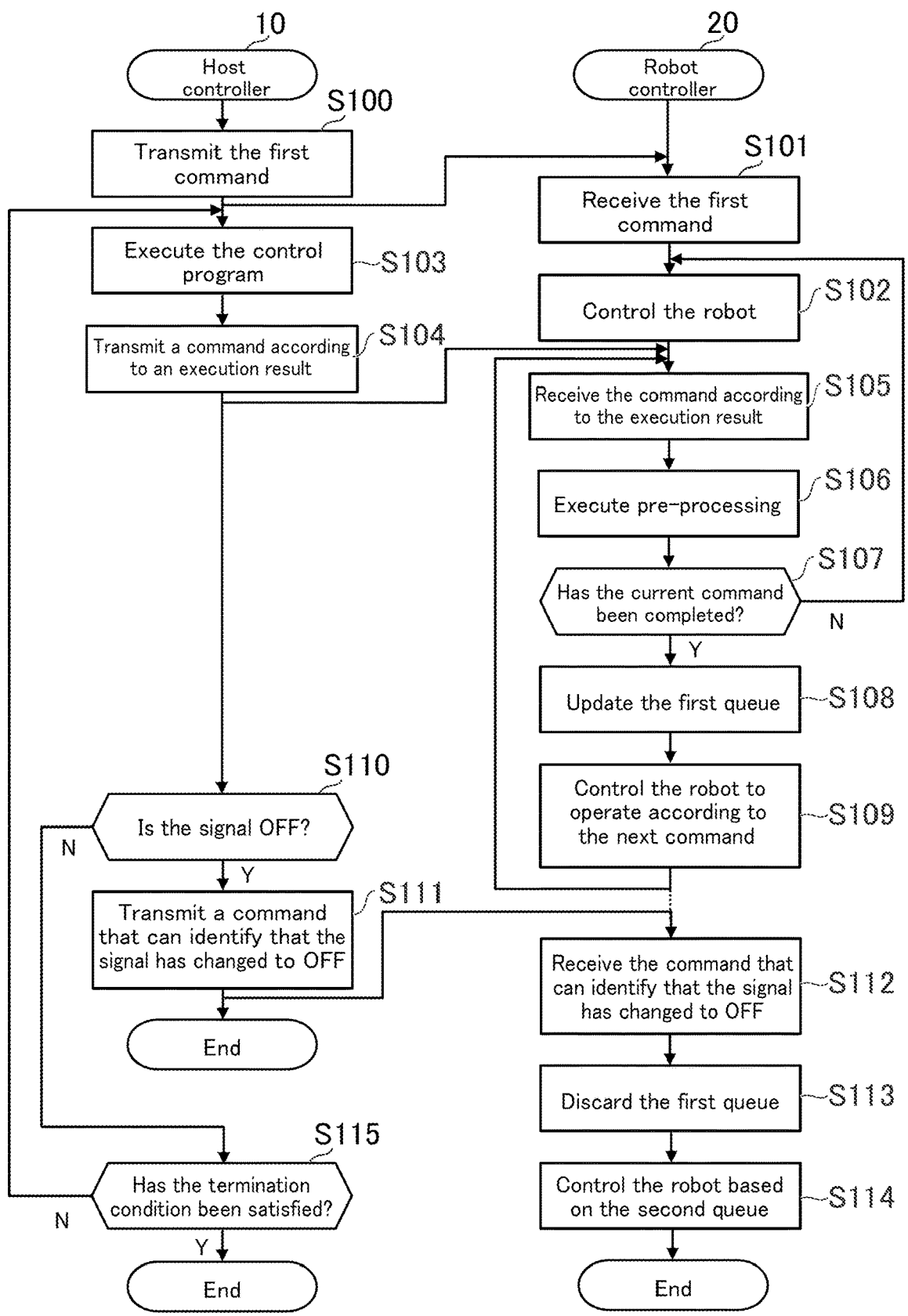
FIG. 7 illustrates an example of processing executed by the robot control system of the first embodiment.

FIG. 7 illustrates an example of processing executed by the robot control system 1 of the first embodiment. The CPU 11 executes the control program (C) stored in the storage part 12, and the CPU 21 executes the firmware (F) stored in the storage part 12, and thereby, the processing illustrated in FIG. 7 is executed. The processing of FIG. 7 is an example of the processing executed by the functional blocks of FIG. 6. The robot controller 20 causes the robot 30 to return to the initial position, and the robot 30 is at the position (P0).

As illustrated in FIG. 7, based on the control program (C), the host controller 10 transmits a first command to the robot controller 20 (S100). The first command is a first code among the codes described in the control program (C) that needs to transmit some command to the robot controller 20. In the example of FIGS. 4 and 5, in S100, the host controller 10 transmits a movement command of "MOVE P1" as the first command to the robot controller 20.

The robot controller 20 receives the first command (S101) and controls the robot 30 based on the received command (S102). In the example of FIGS. 4 and 5, in S101, the robot controller 20 receives the command of "MOVE P1." In S102, the robot controller 20 calculates the trajectory to the position (P1), stores the trajectory in the first queue (Q1), and causes the robot 30 to move on this trajectory.

While the robot controller 20 is executing the current command, the host controller 10 executes the control program (C) (S103), and transmits a command according to an execution result of the control program (C) to the robot controller 20 (S104). In the example of FIGS. 4 and 5, in S103, the host controller 10 executes the code of "Sub Target Send P20." In S104, the host controller 10 transmits a calculation command of "Sub Target Send P20" according to this code.

Upon receiving the command according to the execution result of the control program (S105), the robot controller 20 executes pre-processing according to this command (S106). In the example of FIGS. 4 and 5, in S105, the robot controller 20 receives the calculation command of "Sub Target Send P20," and then, in S106, the robot controller 20 pre-calculates the trajectory to the position (P20) and stores the trajectory in the second queue (Q2).

The robot controller 20 determines whether or not the current command has been completed (S107). When it is not determined that the current command has been completed (S107; N), the processing returns to S102, and the robot controller 20 continues to control the robot 30 based on the current command. After that, when the next command is transmitted, the processing of S105 is executed. When the next command is not transmitted, the processing of S105 and S106 is not executed, and the control of the robot 30 is continued until the current command is completed.

When it is determined in S107 that the current command has been completed (S107; Y), the robot controller 20 updates the first queue (Q1) (S108). Based on the updated first queue (Q1), the robot controller 20 controls the robot 30 to perform an operate according to the next command (S109). After that, when the next command is transmitted, the processing of S105 is executed. When the next command is not transmitted, the processing of S105 and S106 is not executed, and the control of the robot 30 is continued until the current command is completed.

The host controller 10 determines whether or not the signal has changed to OFF (S110). When it is determined that the signal has changed to OFF (S110; Y), the host controller 10 transmits to the robot controller 20 a command that can identify that the signal has changed to OFF (S111). In the example of FIGS. 4 and 5, since the movement command of "MOVE P20" and the movement command of "MOVE P21" can each identify that the signal has changed to OFF, in S112, the host controller 10 transmits these movement commands one after another.

Upon receiving a command that can identify that the signal has changed to OFF (S112), the robot controller 20 discards the first queue (Q1) (S113). In the example of FIGS. 4 and 5, the robot controller 20 discards the calculated trajectories stored in the first queue (Q1). Based on the second queue (Q2), the robot controller 20 controls the robot 30 such that the commands in the case where the signal has changed to OFF are executed (S114), and the present processing ends. In the example of FIGS. 4 and 5, the robot controller 20 controls the robot 30 such that the robot 30 moves to the position (P20) and then to the position (P21).

When it is not determined in S110 that the signal has changed to OFF (S110; N), the host controller 10 determines whether or not a predetermined termination condition has been satisfied (S115). When it is not determined that the termination condition has been satisfied (S115; N), the processing returns to S102, and the control based on the first queue (Q1) is continued. On the other hand, when it is determined that the termination condition has been satisfied (S115; Y), the present processing ends. In the example of FIGS. 4 and 5, since the movement command of "MOVE P3," which is the last command, has been transmitted, this movement command is executed, and the present processing ends. The content of the second queue (Q2) is destroyed when "MOVE P2" is executed.

According to the robot control system 1 of the first embodiment, the robot controller 20 receives a command according to an execution result of the control program (C) by the host controller 10 and executes pre-processing according to the command, and thereby, when the command is actually executed, the processing to be executed is reduced as compared to the case where the processing according to the command is executed from the beginning, and thus, the processing speed in robot control is improved. For example, when it takes time from a decision that a certain command is actually to be executed until processing according to the command is executed, since calculation of the next trajectory has not been completed, it may be necessary to decelerate the robot 30 and then accelerate the robot 30 again toward a target position of the current trajectory. However, due to pre-processing, this time is shortened and it becomes possible to avoid slowing down the robot 30. As a result, production efficiency in a line or cell can be improved, and power consumption in robot control can be reduced.

Further, in the robot control system 1, the robot controller 20 receives a specific command according to a specific code executed by the host controller 10 and executes pre-processing according to the specific command, and thereby, the processing speed in the case where a specific code is present is improved.

Further, in the robot control system 1, the robot controller 20 receives a branch destination command according to a branch destination of a conditional branching of the control program (C), and executes pre-processing according to the branch destination command, and thereby, the processing speed in the case where a branch destination command is actually executed is improved.

Further, in the robot control system 1, the robot controller 20 executes pre-calculation of a trajectory to a target position of the robot 30, and thereby, can quickly move the robot 30 to the target position. For example, when a trajectory is calculated after it is decided to move the robot 30 to a certain target position, it takes time to calculate the trajectory and the robot 30 may slow down. However, by using a pre-calculated trajectory, it becomes possible to avoid slowing down the robot 30. As a result, production efficiency in a line or cell can be improved, and power consumption in robot control can be reduced.

Further, in the robot control system 1, the robot controller 20 executes pre-calculation of a first trajectory according to a first calculation command and pre-calculation of a second trajectory according to a second calculation command, and thereby, can quickly move the robot 30 to a first target position or a second target position. For example, when a first trajectory or a second trajectory is calculated after it is decided to move to a first target position or a second target position, it takes time to calculate the trajectories and the robot 30 may slow down. However, by using pre-calculated first trajectory or second trajectory, it becomes possible to avoid slowing down the robot 30. As a result, production efficiency in a line or cell can be improved, and power consumption in robot control can be reduced.

Further, in the robot control system 1, by executing pre-calculation of a first trajectory from a first reference position to a first target position according to a first calculation command and pre-calculation of a second trajectory from a second reference position to a second target position according to a second calculation command, the robot 30 can be quickly moved from the first reference position to the first target position or from the second reference position to the second target position. It becomes possible to avoid slowing down the robot 30, and production efficiency in a line or cell can also be improved, and power consumption in robot control can be reduced.

Further, in the robot control system 1, when a command different from a command that has executed pre-processing is executed, since an execution result of the pre-processing becomes unnecessary, the execution result of the pre-processing is discarded, and thereby, the memory of the robot controller 20 can be effectively used.

Further, in the robot control system 1, by executing processing according to a command based on a result of pre-processing stored in a storage area according to the command, storage areas can be properly used according to commands, and the processing speed in the robot control system 1 is improved.

2. Second Embodiment

Next, a second embodiment is described. In the first embodiment, the case is described where the pre-processing according to the control program (C) is realized by preparing the first queue (Q1) and the second queue (Q2). In the second embodiment, a case is described where the pre-processing according to the control program (C) is realized by tree structure data (T) instead of queues. In the second embodiment described below, description about structural elements that are the same as those of the first embodiment is omitted.

Figure 8:
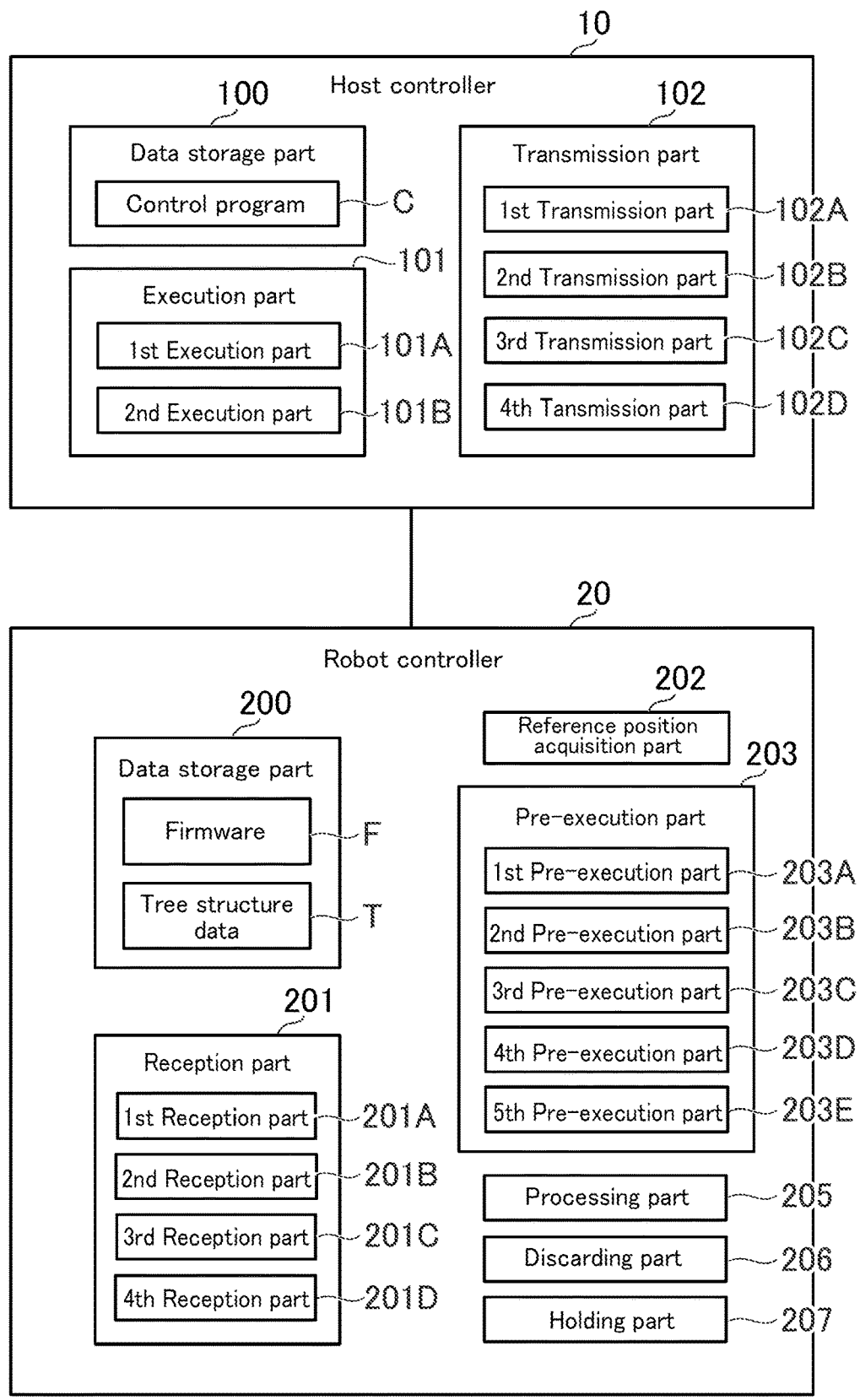
FIG. 8 is a functional block diagram of a second embodiment.

FIG. 8 is a functional block diagram of the second embodiment. As illustrated in FIG. 8, the robot controller 20 of the second embodiment includes a holding part 207. The holding part 207 is mainly realized by the CPU 21. The holding part 207 holds an execution result of pre-processing in association with a command received from the host controller 10. In the second embodiment, the tree structure data (T) is described as an example of association between a command and an execution result of pre-processing. The tree structure data (T) is stored in the data storage part 200.

Figure 9:
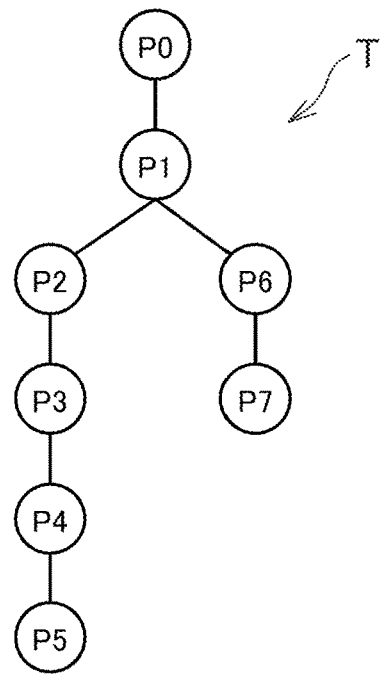
FIG. 9 illustrates an example of tree structure data in the second embodiment.
Figure 9:
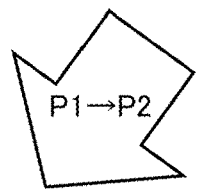
Figure 9:
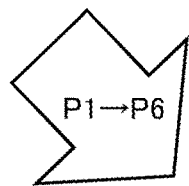
Figure 9:
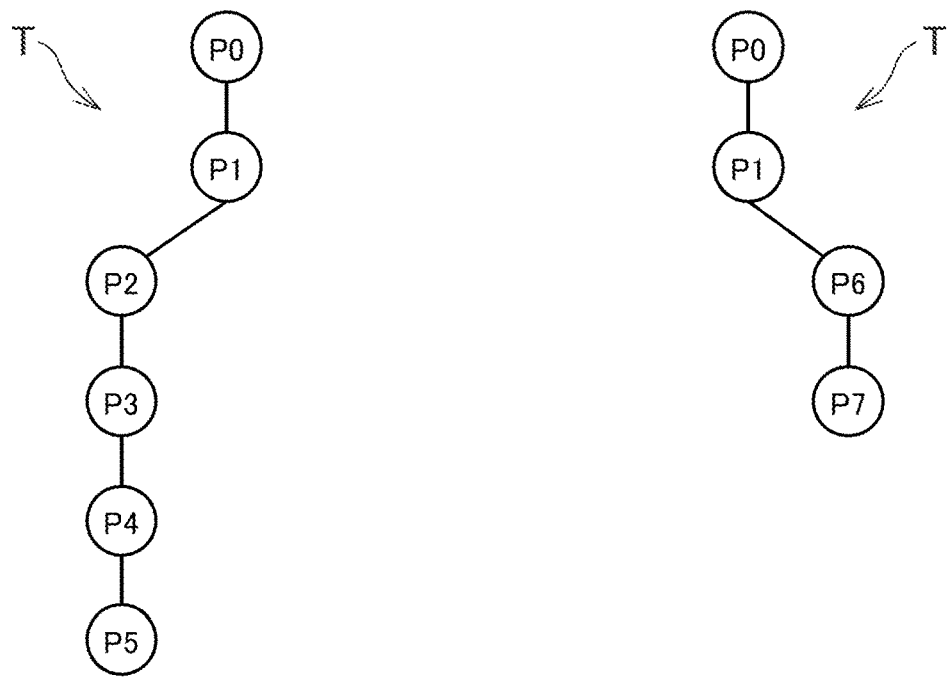

FIG. 9 illustrates an example of the tree structure data (T) in the second embodiment. As illustrated in FIG. 9, in the second embodiment, a case is described where branching occurs after a position (P1). In the example of FIG. 9, after the position (P1), there is a route where the robot 30 moves to positions (P2-P5) and a route where the robot 30 moves to position (P6, P7). Since the position where these routes are separated is predetermined, it can be said to be a static branching. On the other hand, changing a movement destination of the robot 30 due to occurrence of some sudden event can be said to be a dynamic branching.

In the second embodiment, as an example of a condition of a conditional branching, a predetermined input signal at a time when the robot 30 arrives at the position (P1) is described. This input signal is a signal for determining the trajectory of the robot 30. For example, the input signal is a signal indicating a position of a workpiece, a signal indicating a state of a peripheral device, or a signal indicating a position of another robot. When the robot 30 arrives at the position (P1), it proceeds to the position (P2) when a predetermined input signal is OFF, and proceeds to the position (P6) when the input signal is ON.

In the example of FIG. 9, it is assumed that all pre-calculations of trajectories to the positions (P2-P7) have been completed. In the tree structure data (T), movement commands or calculation commands of the positions (P2-P5) are respectively associated with trajectories to the positions (P2-P5). Similarly, in the tree structure data (T), movement commands or calculation commands of the positions (P6, P7) are respectively associated with trajectories to the positions (P6, P7). The tree structure data (T) also includes information that can identify that a branching occurs at the position (P1).

Based on an execution result of pre-processing held in association with a command received from the host controller 10, the processing part 205 executes processing according to this command. For example, when a command for branching to the position (P2) is received from the host controller 10, the processing part 205 controls the robot 30 to move on the trajectory to the position (P2) held in the tree structure data (T). In this case, as illustrated in FIG. 9, the trajectories to the positions (P6, P7) may be discarded.

When a command for branching to the position (P6) is received from the host controller 10, the processing part 205 controls the robot 30 to move on the trajectory to the position (P6) held in the tree structure data (T). In this case, as illustrated in FIG. 9, the trajectories to the positions (P2-P5) may be discarded. In the second embodiment, the same flow as in FIG. 7 is executed, except that the tree structure data (T) is used without using the queues. Other aspects are the same as the first embodiment.

According to the second embodiment, by executing processing according to a command based on a result of pre-processing held in associated with the command, management of commands to be executed is efficiently performed and the processing speed in the robot control system 1 is improved.

3. Third Embodiment

Next, a third embodiment is described. In the first embodiment and the second embodiment, the case is described as an example where the host controller 10 controls the robot controller 20. It is also possible that in the robot control system 1, the host controller 10 is not present. The robot controller 20 may control the robot 30 based on a robot program (R) in which processing procedures of robot control are defined without receiving a command from the host controller 10. The robot program (R) includes codes for controlling the robot 30. The robot program (R) can be created using any language, for example, can be created using the robot language or the C language. In the third embodiment described below, description about structural elements that are the same as those in the first embodiment and the second embodiment is omitted.

Figure 10:
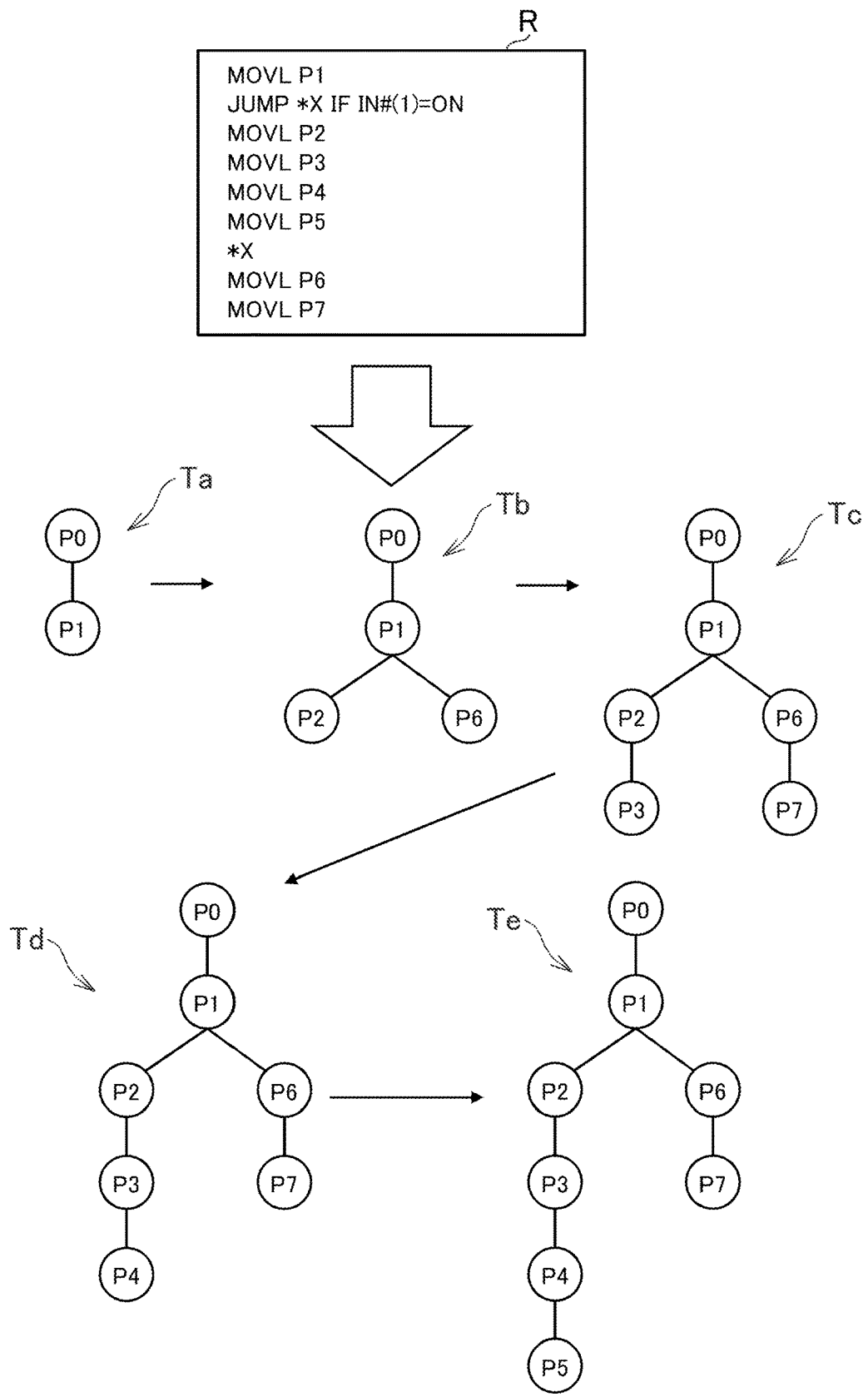
FIG. 10 illustrates an example of a robot program in a third embodiment.

FIG. 10 illustrates an example of the robot program (R) in the third embodiment. In the third embodiment, a case is described as an example where the same processing as in the second embodiment is realized by a tree structure. However, it is also possible that the queues described in the first embodiment are used. The third embodiment differs from the first embodiment and the second embodiment in whether a command from the host controller 10 is required or processing is completed by the robot controller 20 alone, but has the same basic mechanism as the first embodiment and the second embodiment.

As illustrated in FIG. 10, the robot controller 20 pre-reads the robot program (R), and updates the tree structure data (T) every time a trajectory calculation occurs. Pre-reading is referencing a part of unprocessed codes in advance. For example, referencing codes that are ahead of codes being executed corresponds to pre-reading. While the robot controller 20 is executing a certain code, referencing codes following that code corresponds to pre-reading. For example, pre-reading a code of a branch destination corresponds to a pre-reading of a conditional branching. In FIG. 10, changes in the information of the tree structure data (T) are distinguished by adding a lowercase alphabet to the end of the reference symbol "T."

In the example of FIG. 10, the robot controller 20 executes "MOVL P1," which is the first code, calculates the trajectory to the position (P1), and updates the tree structure data (T) (the state of the tree structure data (Ta)). The robot controller 20 pre-reads "JUMP *X IF IN # (1)=ON," which is the next code. This code is a command for jumping to a position of "*X" when a predetermined input signal is ON. This code is executed when the robot 30 has moved to the position (P1).

At this point, since it is still in a pre-reading stage, the robot controller 20 pre-reads "MOVL P2" for the case of not jumping to "*X" and "MOVL P6" for the case of jumping to "*X." The robot controller 20 pre-calculates the trajectory to the position (P2) and the trajectory to the position (P6), and updates the tree structure data (T) (the state of the tree structure data (Tb)).

The robot controller 20 pre-reads "MOVL P3" for the case not jumping to "*X" and "MOVL P7" for the case of jumping to "*X." The robot controller 20 pre-calculates the trajectory to the position (P3) and the trajectory to the position (P7), and updates the tree structure data (T) (the state of the tree structure data (Tc)). Since there is no more code for the case of jumping to "*X," no calculation is performed after the trajectory to the position (P7).

The robot controller 20 pre-reads "MOVL P4" and "MOVE P5" for the case of not jumping to "*X" and pre-calculates the trajectories to the positions (P4, P5) one after another, and updates the tree structure data (T) (the states of tree structure data (Td, Te)). The robot controller 20 may pre-read "MOVL P4" and "MOVE P5" for the case of not jumping to "*X" and calculates a trajectory after the position (P5). The robot controller 20 references an input signal when the robot 30 reaches the position (P1) and determines a route after the position (P1). Subsequent processing is the same as in the second embodiment, and when moving to one route, the calculation results for the other route may be discarded. For the case of not jumping to "*X,"

the robot controller 20 also needs the trajectories to the positions (P6, P7) after calculating the trajectories to the positions (P4, P5). A trajectory from the position (P5) to the position (P6) needs to be calculated. However, for the trajectory from the position (P6) to the position (P7), the already calculated trajectory can be used and re-calculation is unnecessary.

Figure 11:
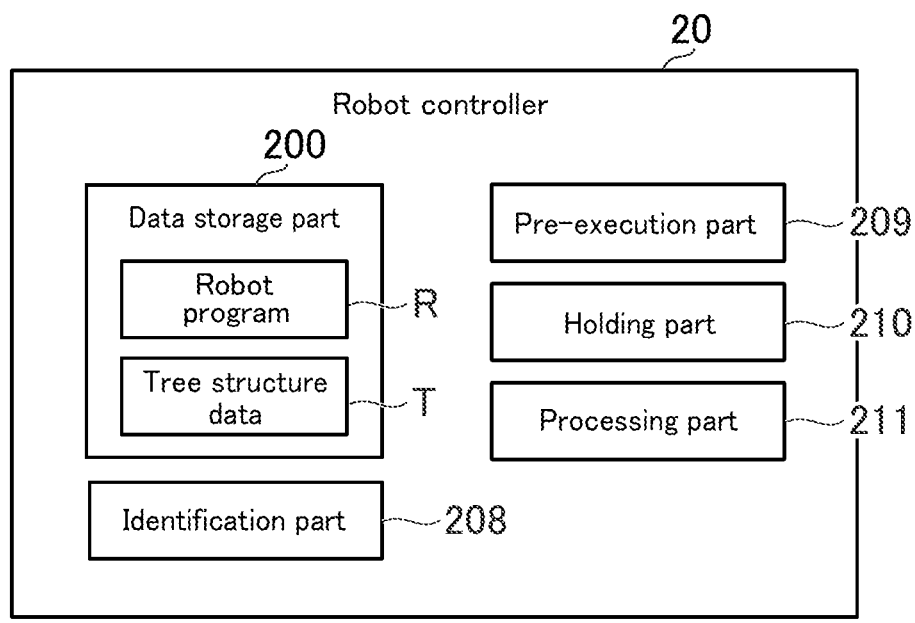
FIG. 11 is a functional block diagram of the third embodiment.

FIG. 11 is a functional block diagram of the third embodiment. As illustrated in FIG. 11, the robot controller 20 of the third embodiment includes a data storage part 200, an identification part 208, a pre-execution part 209, a holding part 210, and a processing part 211. The identification part 208, the pre-execution part 209, the holding part 210, and the processing part 211 are mainly realized by the CPU 21. Since processing contents of the pre-execution part 209, the holding part 210, and the processing part 211 are partially different from those in the second embodiment, they are indicated using different reference numeral symbols for distinction.

The identification part 208 identifies a code to be executed. A code to be executed is the same as a code for executing a specific command described in the first embodiment. A code to be pre-read is an example of a code to be executed. For example, in the example of FIG. 10, the IF statement corresponds to a specific code. A specific code may be any code and is not limited to the example of the third embodiment. For example, a specific code may be a code when a calculation of a trajectory occurs.

For example, a specific code may be a code when a calculation amount of the robot controller 20 is equal to or more than a reference. Further, for example, a specific code may be a code indicating a conditional branching. Further, for example, a specific code may be a code for detecting occurrence of a predetermined event. Information that identifies a specific code may be defined in the robot program (R) or may be defined in other parts. In addition, for example, it may be specified by a user from an operating device (so-called programming pendant).

The pre-execution part 209 pre-reads whether or not the robot program (R) includes a code identified by the identification part 208. The pre-execution part 209 determines whether or not there is a specific code in the robot program (R). In the example of FIG. 10, the identification part 208 determines whether or not there is an IF statement in the robot program (R). The pre-reading of the robot program (R) may be realized by an interpreter, or may be realized using any method such as a method using an API used in the C language or the like.

The pre-execution part 209 executes pre-processing according to a code identified by the identification part 208 based on an execution result of pre-reading. For example, the pre-execution part 209 pre-calculates a trajectory to a target position based on a pre-read code. The holding part 210 holds a pre-calculation result in the tree structure data (T). The processing part 211 controls the robot 30 based on a pre-calculated trajectory.

When there are multiple branch destinations, the pre-execution part 209 executes pre-processing of each of the multiple branch destinations, and the holding part 210 holds an execution result of pre-processing for each of the branch destinations in the tree structure data (T). The processing part 211 determines which branch destination to proceed to based on a condition of a conditional branching, and controls the robot 30 based on pre-processing of the branch destination. An execution result of pre-processing of branch destinations that is no longer needed is discarded at any timing.

According to the robot control system 1 of the third embodiment, the robot controller 20 identifies a code to be executed in the robot program (R) and executes pre-processing according to the identified code, and thereby, when the code is actually executed, the processing to be executed is reduced as compared to the case where the processing according to the code is executed from the beginning, and thus, the processing speed in robot control is improved. For example, when it takes time from a decision that a certain code is actually to be executed until processing according to the code is executed, since calculation of the next trajectory has not been completed, it may be necessary to decelerate the robot 30 and then accelerate the robot 30 again toward a target position of the current trajectory. However, due to pre-processing, this time is shortened and it becomes possible to avoid slowing down the robot 30. As a result, production efficiency in a line or cell can be improved, and power consumption in robot control can be reduced.

4. Modified Embodiments

The present invention is not limited to the embodiments described above. Appropriate modifications are possible within a scope without departing from the spirit of the present invention.

Figure 12:
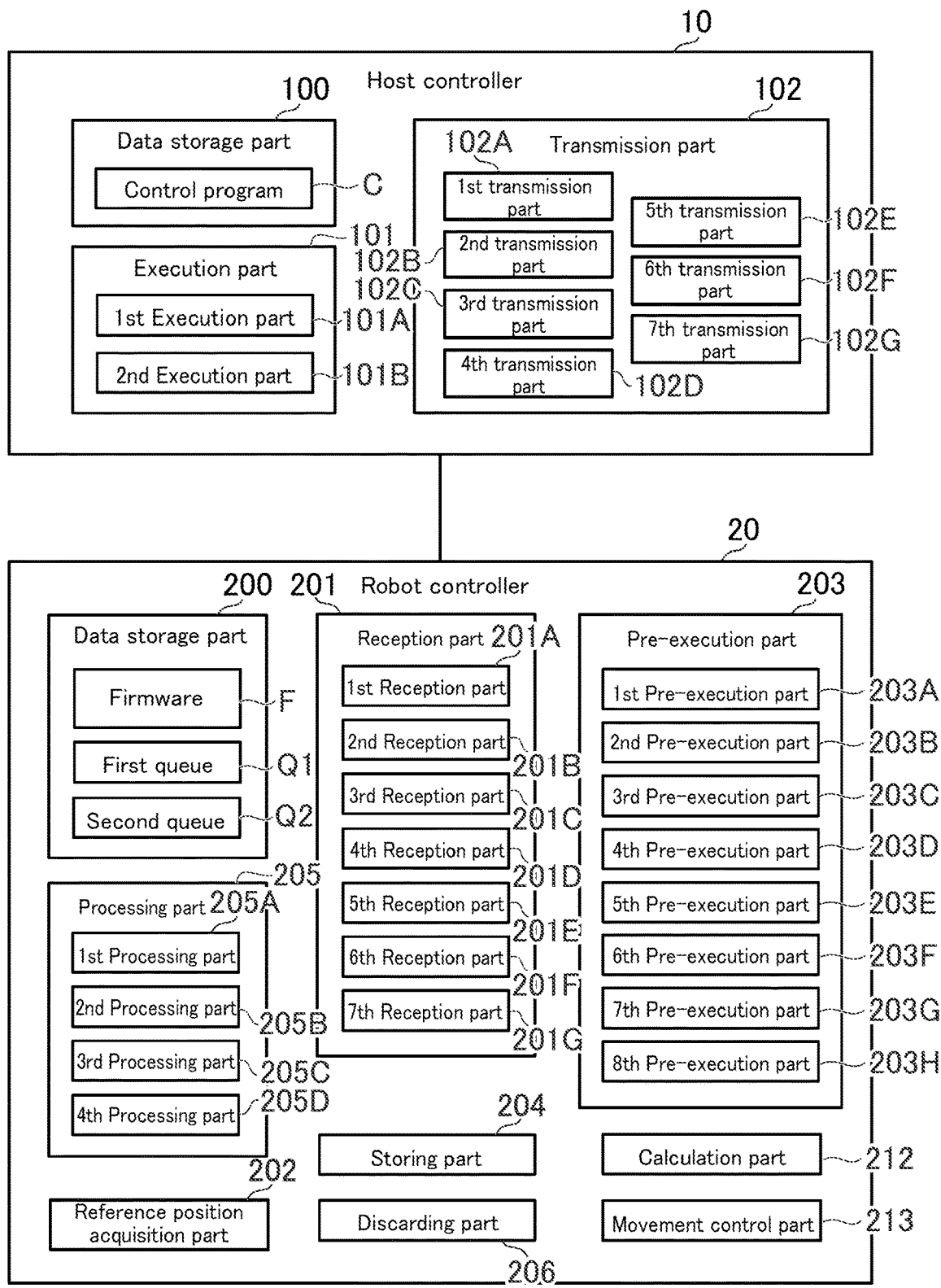
FIG. 12 is a functional block diagram of a modified embodiment.

FIG. 12 is a functional block diagram of a modified embodiment. In the modified embodiments described below, a case is described as an example where the host controller 10 is present as in the first embodiment and the second embodiment. As illustrated in FIG. 12, the host controller 10 includes a fifth transmission part (102E), a sixth transmission part (102F), and a seventh transmission part (102G). The robot controller 20 includes a fifth reception part (201E), a sixth reception part (201F), a seventh reception part (201G), a sixth pre-execution part (203F), a seventh pre-execution part (203G), an eighth pre-execution part (203H), a first processing part (205A), a second processing part (205B), a calculation part 212, and a movement control part 213. A third processing part (205C) has the same function as the processing part 205 of the first embodiment. A fourth processing part (205D) has the same function as the processing part 205 of the second embodiment.

(1) For example, when the trajectory of the robot 30 branches, branching position information about a branching position may be transmitted to the robot controller 20. The host controller 10 in the modified embodiment (1) includes the fifth transmission part (102E). The fifth transmission part (102E) transmits branching position information about a branching position where the trajectory of the robot 30 branches to either a first trajectory or a second trajectory to the robot controller 20. When the robot 30 is moved as in the first embodiment or the second embodiment, the position (P1) corresponds to a branching position.

The robot controller 20 in the modified embodiment (1) includes the fifth reception part (201E) and the sixth pre-execution part (203F). The fifth reception part (201E) receives branching position information from the host controller 10. Branching position information may be included in a movement command or a calculation command, or may be transmitted separately from a command. Branching position information includes coordinates indicating a branching position. A branching position is defined in the control program (C), but may be specified by the user or dynamically determined on the spot.

The sixth pre-execution part (203F) executes pre-calculation of a first trajectory and pre-calculation of a second trajectory based on branching position information. The sixth pre-execution part (203F) executes the pre-calculation of the first trajectory such that the robot 30 branches from the branching position and moves on the first trajectory. The sixth pre-execution part (203F) executes the pre-calculation of the second trajectory such that the robot 30 branches from the branching position and moves on the second trajectory. A branching position corresponds to a reference position in the first embodiment. A method for calculating a trajectory based on a branching position, which is an example of a reference position, is as described in the first embodiment.

According to the modified embodiment (1), by executing pre-calculation of a first trajectory and pre-calculation of a second trajectory based on branching position information about a branching position where the robot 30 branches to either the first trajectory or the second trajectory, there is no need to calculate the branching position on the robot controller 20 side.

(2) For example, in the first embodiment, the case is described where the host controller 10 detects that a predetermined event has occurred. However, it is also possible that the event detection is performed by the robot controller 20. In this case, the host controller 10 may notify the robot controller 20 of a position in the control program (C) where a predetermined event occurs (that is, the timing at which the event can occur).

The host controller 10 in the modified embodiment (2) includes the sixth transmission part (102F). The sixth transmission part (102F) transmits code position information about a position of a specific code in the control program (C) to the robot controller 20. In the example of FIG. 4, since an event occurs before the robot 30 arrives at the position (P1), the code position information indicates completion of execution of "MOVL P1." The code position information may be a position of another code, for example, a position of an IF statement. Further, for example, when multiple IF statements exist, a position of a specific IF statement may be indicated as code position information such that only the specific IF statement is executed. The code position information may be included in a calculation command for pre-calculation of a trajectory, or may be included in a command different from this calculation command.

The robot controller 20 in the modified embodiment (2) includes the fifth reception part (201E) and the first processing part (205A). The fifth reception part (201E) receives the code position information from the host controller 10. The first processing part (205A) executes processing according to a specific code based on code position information and an execution result of pre-processing. The first processing part (205A) determines whether or not to execute processing that uses an execution result of pre-processing based on code position information. In the example of FIG. 4, the first processing part (205A) determines whether or not a predetermined event has been detected before the robot 30 arrives at the position (P1). When it is determined that a predetermined event has been detected before the robot 30 arrives at the position (P1), the first processing part (205A) moves the robot 30 to the position (P20) based on the pre-calculated trajectory. Subsequent processing is as described in the first embodiment.

According to the modified embodiment (2), by executing processing according to a specific code based on code position information received from the host controller 10 and an execution result of pre-processing, the robot controller 20 can more quickly execute the processing according to the specific code. For example, a condition of a conditional branching can be determined on the robot controller 20 side, and a processing load of the host controller 10 can be reduced. When a condition of a conditional branching is determined on the robot controller 20 side, since it is no longer necessary to receive a determination result from the host controller 10, the robot 30 can be more quickly controlled.

(3) For example, the robot controller 20 may include the calculation part 212 that, when a predetermined event occurs while the robot 30 is moving to a first target position, calculates a trajectory for moving from a position where the event has occurred to a second target position. This event may be an ON/OFF of a signal as described in the first embodiment, or may be occurrence of an anomaly. The occurrence of the event may be detected by the host controller 10 or the robot controller 20.

Figure 13:
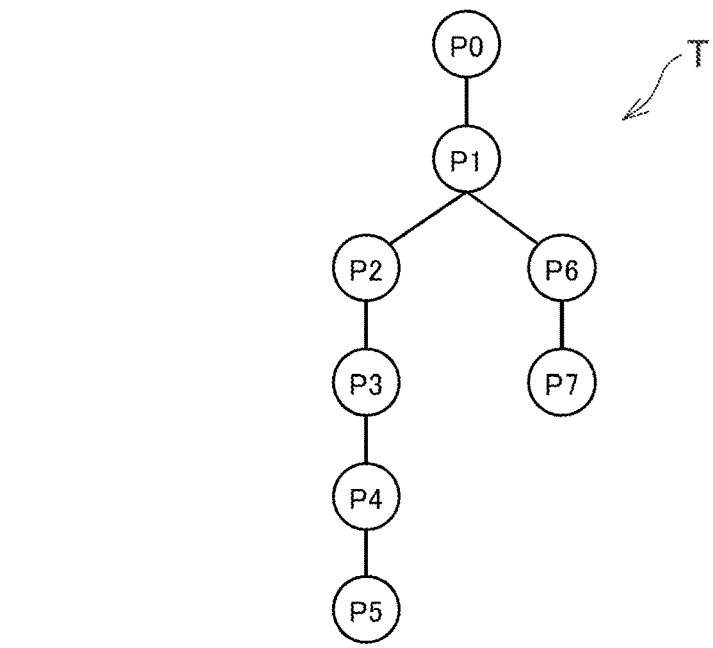
FIG. 13 illustrates an example of processing in a modified embodiment (3)
Figure 13:
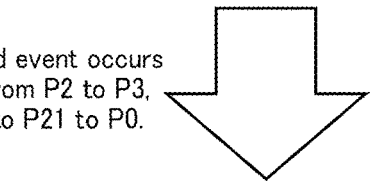
Figure 13:
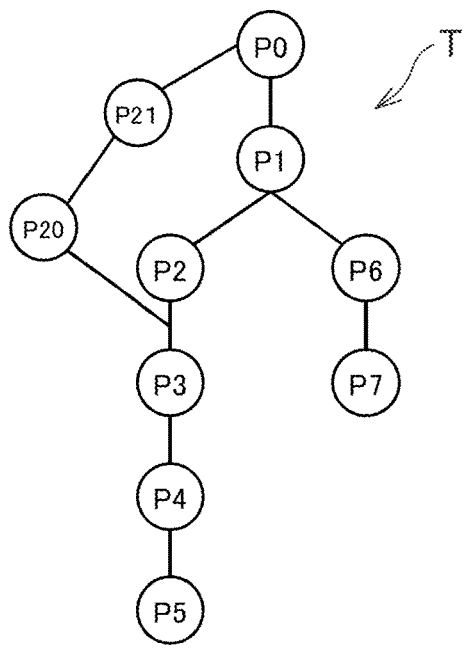

FIG. 13 illustrates an example of processing in the modified embodiment (3). FIG. 13 describes how a trajectory is calculated using the tree structure data (T) as in the second embodiment as an example. FIG. 13 illustrates a case where a predetermined event occurs while the robot 30 is moving from the position (P2) to the position (P3) and the robot 30 returns to the position (P0) via positions (P20, P21). In this case, after the occurrence of the event, the calculation part 212 calculates a trajectory to the position (P20), a trajectory to the position (P21), and a trajectory to the position (P0). The positions (P20, P21) are defined in the control program (C). The position (P0) is the initial position, which is known in advance by the robot controller 20.

After a predetermined event occurs, the host controller 10 transmits a command for moving to the position (P20) and a command for moving to the position (P21) to the robot controller 20. The positions (P20, P21) have already been transmitted to a queue or the like provided separately before the occurrence of the predetermined event. However, it is also possible that the positions (P20, P21) are included in movement commands transmitted after the occurrence of the predetermined event. The calculation part 212 of the robot controller 20 may calculate the trajectories based on these movement commands. The calculation part 212 may calculate a trajectory for a case of returning to the initial position as the trajectory to the position (P0). These trajectories are calculated on the spot when the predetermined event occurs. The calculation part 212 may pre-calculate the trajectory from the position (P20) to the position (P21) and the trajectory from the position (P21) to the position (P0) before the predetermined event occurs. In this case, after the predetermined event occurs, the calculation part 212 only needs to calculate a trajectory from the position where the event occurs to the position (P20).

Figure 14:
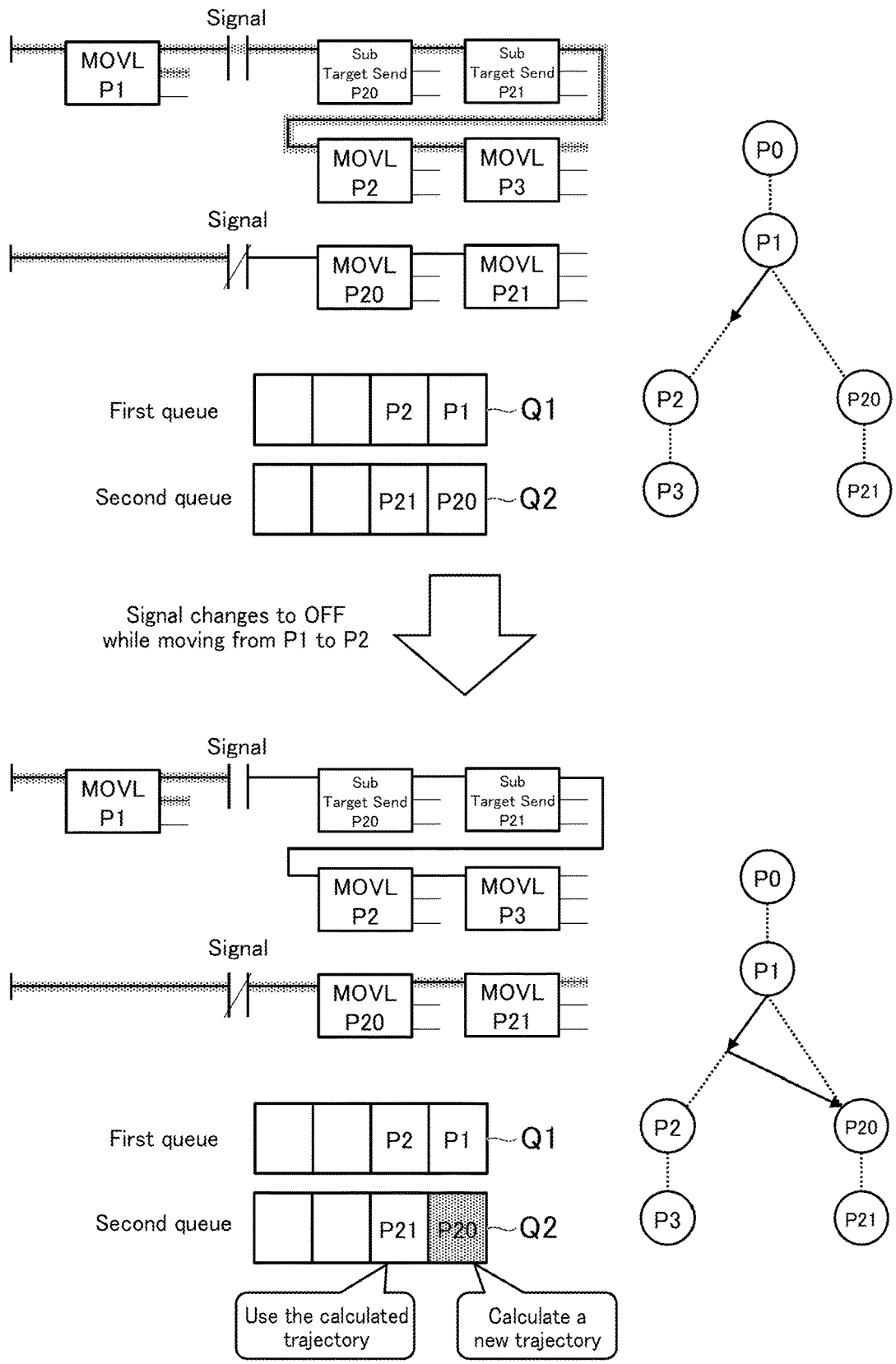
FIG. 14 illustrates an example of processing in the modified embodiment (3).

FIG. 14 illustrates an example of processing in the modified embodiment (3). In FIG. 14, a case is described as an example where a first queue (Q1) and a second queue (Q2) are used as in the first embodiment. FIG. 14 illustrates a case where the signal described in the first embodiment changes from ON to OFF while the robot 30 is moving from the position (P1) to the position (P2), and the robot 30 moves from the position at that time (a position between the position (P1) and the position (P2)) to the position (P20). In this case, since the robot 30 is not at the position (P1), the trajectory from the position (P1) to the position (P20) cannot be used, but the trajectory from the position (P20) to the position (P21) can be diverted. The calculation part 212 acquires a current position of the robot 30 and calculates a new trajectory from the current position to the position (P20). For the trajectory from the position (P20) to the position (P21), the calculated one is used without recalculation. The control of the robot 30 after the calculation part 212 has calculated the trajectories is the same as in the first embodiment and the second embodiment.

According to the modified embodiment (3), when a predetermined event occurs while the robot 30 is moving to a first target position, by calculating a trajectory for moving from the position where the event occurs to a second target position, even when the predetermined event occurs, the robot 30 can be moved to the second target position and the occurred event can be promptly dealt with.

(4) Further, for example, in the modified embodiment (2), the case is described where the code position information is transmitted. However, it is also possible that, instead of a code position in the control program (C), the timing of a conditional branching is transmitted to the robot controller 20. For example, since a change in production plan corresponds to a conditional branching, the timing when the production plan is changed or the timing when the production plan is to be changed in the future may be transmitted to the robot controller 20.

The host controller 10 in the modified embodiment (4) includes the first execution part (101A) and the seventh transmission part (102G). The first execution part (101A) is as described in the first embodiment. The seventh transmission part (102G) transmits timing information about the timing of a conditional branching to the robot controller 20. The timing information is the timing at which a conditional branching occurs. The timing of a conditional branching may be defined in the control program (C) or may be dynamically determined based on an external factor. For example, the timing information is information that can identify whether or not the timing of a conditional branching has already arrived or when a conditional branching arrives.

The robot controller 20 in the modified embodiment (4) includes the sixth reception part (201F) and the second processing part (205B). The sixth reception part (201F) receives timing information from the host controller 10. The second processing part (205B) executes processing according to a branch destination based on the timing information and an execution result of pre-processing. The second processing part (205B) determines whether or not a condition of a conditional branching is satisfied based on the timing information. This condition may be included in the timing information. The second processing part (205B) determines whether or not the timing of the conditional branching has arrived. When it is determined that the timing of the conditional branching has arrived, the second processing part executes processing using an execution result of pre-processing. The processing using an execution result of pre-processing is as described in the first embodiment and the second embodiment.

According to the modified embodiment (4), by executing processing according to a branch destination based on the timing information received from the host controller 10 and an execution result of pre-processing, the robot controller 20 can more quickly execute processing in the case of proceeding to a branch destination.

(5) Further, for example, the robot controller 20 may include the movement control part 213 that, before the robot 30 reaches a predetermined target position, based on an execution result of pre-processing, causes the robot 30 to start decelerating and start moving to the next target position. In the example of FIGS. 4 and 5, when a predetermined event occurs, the robot 30 starts moving to the position (P20) at a constant speed without decelerating. However, it is also possible that the movement control part 213 causes the robot 30 to slow down to some extent and then start moving to the position (P20), which is the next target position. For example, when the current speed of the robot 30 exceeds a specified speed by moving to the position (P20), the movement control part 213 may cause the robot 30 to decelerate to the specified speed and start moving to the position (P20).

According to the modified embodiment (5), before the robot 30 reaches a predetermined target position, based on pre-processing, the robot 30 is caused to start decelerating and start moving to the next target position, and thereby, the robot 30 can quickly reach the next target position.

(6) Further, for example, the robot controller 20 may include the seventh pre-execution part (203G) that executes pre-processing related to controlling a peripheral device of the robot 30 according to a command from the host controller 10. The peripheral device may be any device related to robot control, and may be, for example, an I/O device, a sensor, a processing machine, a measuring device, an inspection device, or a robot other than the robot 30. The pre-processing may be a standby of the peripheral device or may be causing the peripheral device to perform some calculation. The pre-processing executed by the seventh pre-execution part (203G) may be processing corresponding to preparation required for subsequent control of the robot 30.

According to the modified embodiment (6), the robot controller 20 executes pre-processing related to controlling a peripheral device of the robot 30 based on a command, and thereby, the processing speed of the peripheral device is improved.

(7) Further, for example, the robot controller 20 may include the eighth pre-execution part (203H) that, when a command from the host controller 10 includes identification information that can identify that pre-processing is to be executed, executes the pre-processing. "Sub Target Send" described in the first embodiment is an example of this command. As described in the first embodiment, that pre-processing is required may be identified by some symbol string, or may be identified by another symbol string. The eighth pre-execution part (203H) determines that a received command does not require pre-processing when the command does not include identification information. The eighth pre-execution part (203H) determines that a received command requires pre-processing when the command includes identification information. Details of pre-processing are as described in the first embodiment and the second embodiment.

According to the modified embodiment (7), when a command includes identification information, the robot controller 20 executes pre-processing. Through the identification information, the robot controller (20) recognizes that it is pre-processing.

(8) Further, for example, the above-described modified embodiments may be combined, or the above-described modified embodiments may be applied to the third embodiment.

Further, for example, the functions described above may each be realized by any device in the robot control system 1. Further, for example, the functions described as being included in the host controller 10 may be realized by the robot controller 20. Further, for example, the functions described as being included in the robot controller 20 may be realized by the host controller 10. Further, for example, the functions may be shared between the host controller 10 and the robot controller 20.

A robot control system according to one aspect of the present invention includes: a robot controller that can control a robot; and a host controller that can communicate with the robot controller. The host controller includes: an execution part that executes a control program; and a transmission part that transmits a command according to an execution result of the control program to the robot controller. The robot controller includes: a reception part that receives the command from the host controller; and a pre-execution part that executes pre-processing according to the command.

According to an embodiment of the present invention, a processing speed in robot control is improved, for example.

Obviously, numerous modifications and variations of the present invention are possible in light of the above teachings. It is therefore to be understood that within the scope of the appended claims, the invention may be practiced otherwise than as specifically described herein.

What is claimed is:

1. A robot control system, comprising:
   robot controller circuitry configured to control a robot; and
   host controller circuitry configured to communicate with the robot controller circuitry,
   wherein the host controller circuitry is further configured to execute a control program, and transmit a command according to an execution result of the control program to the robot controller circuitry, the robot controller circuitry is further configured to receive the command from the host controller circuitry, and execute pre-processing according to the command, the host controller circuitry is further configured to transmit code position information about a position of a specific code in the control program to the robot controller circuitry, and the robot controller circuitry is further configured to receive the code position information from the host controller circuitry and execute processing according to the specific code based on the code position information and an execution result of the pre-processing.

2. The robot control system according to claim 1, wherein the host controller circuitry is further configured to execute a specific code of the control program, and transmit a specific command according to the specific code to the robot controller circuitry, and the robot controller circuitry is further configured to receive the specific command from the host controller circuitry, and execute pre-processing according to the specific command.

3. The robot control system according to claim 1, wherein the host controller circuitry is further configured to execute the control program having a conditional branching, and transmit a branch destination command according to a branch destination of the conditional branching to the robot controller circuitry, and the robot controller circuitry is further configured to receive the branch destination command from the host controller circuitry, and execute pre-processing according to the branch destination command.

4. The robot control system according to claim 1, wherein the host controller circuitry is further configured to transmit a calculation command for calculating a trajectory to a target position of the robot to the robot controller circuitry, and the robot controller circuitry is further configured to receive the calculation command from the host controller circuitry; and execute pre-calculation of the trajectory according to the calculation command.

5. The robot control system according to claim 1, wherein the host controller circuitry is further configured to transmit to the robot controller circuitry, according to an execution result of the control program, a first calculation command for calculating a first trajectory to a first target position of the robot, and a second calculation command for calculating a second trajectory to a second target position different from the first target position, and the robot controller circuitry is further configured to receive the first calculation command and the second calculation command from the host controller circuitry; and execute pre-calculation of the first trajectory according to the first calculation command and pre-calculation of the second trajectory according to the second calculation command.

6. The robot control system according to claim 5, wherein the robot controller circuitry is further configured to acquire a first reference position of the robot according to the first trajectory and a second reference position of the robot according to the second trajectory, and execute pre-calculation of the first trajectory from the first reference position to the first target position and pre-calculation of the second trajectory from the second reference position to the second target position.

7. The robot control system according to claim 5, wherein the host controller circuitry is further configured to transmit branching position information about a branching position where a trajectory of the robot branches to either the first trajectory or the second trajectory to the robot controller circuitry, and the robot controller circuitry is further configured to receive the branching position information from the host controller circuitry; and execute pre-calculation of the first trajectory and pre-calculation of the second trajectory based on the branching position information.

8. The robot control system according to claim 1, wherein the robot controller circuitry is further configured to calculate, when a predetermined event occurs while the robot is moving to a first target position, a trajectory for moving from a position where the predetermined event occurs to a second target position.

9. The robot control system according to claim 1, wherein the robot controller circuitry is further configured to discard an execution result of the pre-processing when a second command different from the command is executed.

10. The robot control system according to claim 1, wherein the robot controller circuitry is further configured to cause, before the robot reaches a predetermined target position and based on an execution result of the pre-processing, the robot to start decelerating and start moving to the next target position.

11. The robot control system according to claim 1, wherein the robot controller circuitry is further configured to execute pre-processing related to control of a peripheral device of the robot according to the command.

12. The robot control system according to claim 1, wherein the command includes identification information that can identify that the pre-processing is to be executed, and the robot controller circuitry is further configured to execute the pre-processing when the identification information is included in the command.

13. The robot control system according to claim 1, wherein the robot controller circuitry is further configured to store an execution result of the pre-processing in a storage area according to the command among multiple storage areas, and execute processing according to the command based on an execution result of the pre-processing stored in a storage area according to the command.

14. The robot control system according to claim 1, wherein the robot controller circuitry is further configured to hold an execution result of the pre-processing in association with the command, and execute processing according to the command based on an execution result of the pre-processing held in association with the command.

15. A robot control system comprising:
   robot controller circuitry configured to control a robot; and host controller circuitry configured to communicate with the robot controller circuitry, wherein the host controller circuitry is further configured to execute a control program, and transmit a command according to an execution result of the control program to the robot controller circuitry, the robot controller circuitry is further configured to receive the command from the host controller circuitry, and execute pre-processing according to the command, the host controller circuitry is further configured to execute the control program having a conditional branching; and transmit timing information about a timing of the conditional branching to the robot controller circuitry, and the robot controller circuitry is further configured to receive the timing information from the host controller circuitry; and execute processing according to a branch destination of the conditional branching based on the timing information and an execution result of the pre-processing.

16. The robot control system according to claim 15, wherein the host controller circuitry is further configured to execute a specific code of the control program and transmit a specific command according to the specific code to the robot controller circuitry, and the robot controller circuitry is further configured to receive the specific command from the host controller circuitry and execute pre-processing according to the specific command.

17. The robot control system according to claim 15, wherein the host controller circuitry is further configured to transmit a branch destination command according to a branch destination of the conditional branching to the robot controller circuitry, and the robot controller circuitry is further configured to receive the branch destination command from the host controller circuitry and execute pre-processing according to the branch destination command.

18. A robot control method implemented on robot controller circuitry configured to control a robot and a host controller circuitry configured to communicate with the robot controller circuitry, comprising:

executing, at the host controller circuitry, a control program;

transmitting, from the host controller circuitry, a command according to an execution result of the control program to the robot controller circuitry;

receiving, at the robot controller circuitry, the command from the host controller circuitry;

executing, at the robot controller circuitry, pre-processing according to the command;

transmitting code position information about a position of a specific code in the control program from the host controller circuitry to the robot controller circuitry;

receiving, at the robot controller circuitry, the code position information from the host controller circuitry; and executing, at the robot controller circuitry, processing according to the specific code based on the code position information and an execution result of the pre-processing.

19. The robot control method according to claim 18, wherein the pre-processing executed according to the command is pre-calculating a trajectory of the robot.

20. The robot control method according to claim 18, wherein the pre-processing is executed according to a branch destination of a conditional branching.

* * * * *